US007091479B2

(12) United States Patent
Hayek

(10) Patent No.: US 7,091,479 B2
(45) Date of Patent: Aug. 15, 2006

(54) THREAT IDENTIFICATION IN TIME OF FLIGHT MASS SPECTROMETRY USING MAXIMUM LIKELIHOOD

(75) Inventor: Carleton S. Hayek, Ellicott City, MD (US)

(73) Assignee: The Johns Hopkins University, Baltimore, MD (US)

(*) Notice: Subject to any disclaimer, the term of this patent is extended or adjusted under 35 U.S.C. 154(b) by 245 days.

(21) Appl. No.: 10/846,819

(22) Filed: May 14, 2004

(65) Prior Publication Data

US 2005/0263694 A1 Dec. 1, 2005

Related U.S. Application Data

(63) Continuation-in-part of application No. 10/030,465, filed as application No. PCT/US01/16829 on May 23, 2001, now Pat. No. 6,822,222.

(60) Provisional application No. 60/523,969, filed on Nov. 21, 2003, provisional application No. 60/208,877, filed on Jun. 1, 2000, provisional application No. 60/207,907, filed on May 30, 2000.

(51) Int. Cl.
*B01D 59/44* (2006.01)

(52) U.S. Cl. ...................... 250/287; 250/282; 700/189; 700/181; 436/47; 436/43

(58) Field of Classification Search ................ 250/287, 250/282, 281; 700/189, 181, 28; 436/47, 436/43

See application file for complete search history.

(56) References Cited

U.S. PATENT DOCUMENTS

| | | | | |
|---|---|---|---|---|
| 5,352,891 | A | 10/1994 | Monnig et al. | |
| 5,464,985 | A | 11/1995 | Cornish et al. | |
| 6,008,490 | A | 12/1999 | Kato | |
| 6,229,842 | B1 | 5/2001 | Schulist et al. | |
| 6,253,162 | B1 | 6/2001 | Jarman et al. | |
| 6,487,523 | B1 * | 11/2002 | Jarman et al. | 702/189 |
| 6,489,608 | B1 * | 12/2002 | Skilling | 250/281 |
| 6,730,517 | B1 * | 5/2004 | Koster et al. | 436/47 |

OTHER PUBLICATIONS

Ragunathan N. et al.: "Gas chromotography with spectroscopic detectors" Journal of Chromatography a Elsevier Science, NL. vol. 856, No. 1-2, Sep. 24, 1999, pp. 349-397, XP004180087, ISSN: 0021-9673, p. 386.

Zimmerman G A et al: "Analysis of I/O efficient order-statistic-based nosie power estimators" Digital Signal Processing 2, Estimation VLSI. Sanfrancisco. Mar. 23-26, 1992, Proceedings of the International Conference on Acoustics, Speech and Signal Processing (ICASSP), New York, IEEE, US, vol. 5 Conf. 17, Mar. 23, 1992, pp. 437-440, XP010059317, ISBN: 0-7803-0532-9, p. V-437.

* cited by examiner

*Primary Examiner*—Kiet T. Nguyen
(74) *Attorney, Agent, or Firm*—Francis A. Cooch

(57) ABSTRACT

A method for determining a threat substance encountered by a time-of-flight mass spectrometer (TOF-MS) using a pre-computed threat library is described. The method comprising the steps of acquiring a spectrum of a test substance, wherein the acquired spectrum is an average of individual spectra acquired from a plurality of laser shots on the analyte; identifying mass/charge (m/z) values corresponding to each of a plurality of spectral peaks of the acquired spectrum; assigning a corresponding ranking code to the acquired spectrum based on the plurality of its spectral peaks and troughs, wherein a peak presence is indicated by a numeral 1, while peak absence is indicated by a numeral 0, relative to each of a set of substances in a threat library; comparing the assigned rankings of the acquired spectrum over all threat substances stored in the threat library; and identifying the threat substance as that which produced the highest ranking.

10 Claims, 10 Drawing Sheets

FIG. 1
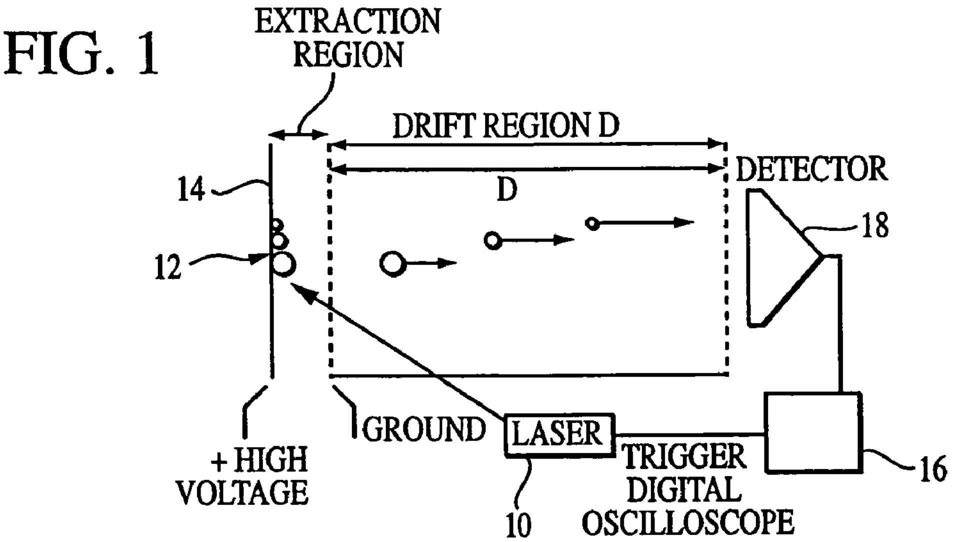
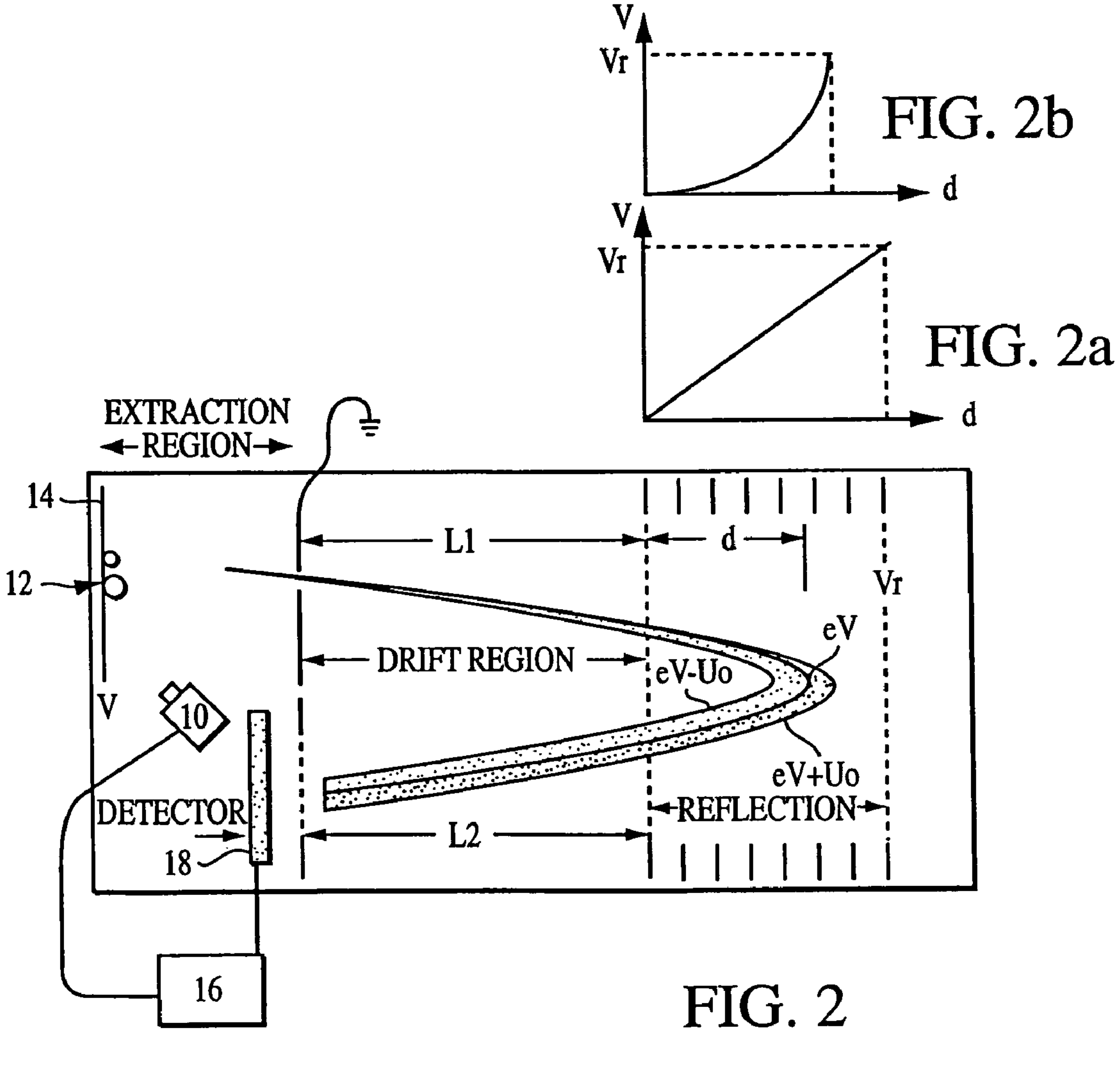
FIG. 2b
FIG. 2a
FIG. 2

THREAT IDENTIFICATION IN TIME OF FLIGHT MASS SPECTROMETRY USING MAXIMUM LIKELIHOOD

RELATED APPLICATIONS

This application claims the benefit of U.S. provisional application Ser. No. 60/523,969, filed Nov. 21, 2003, the contents of which are hereby incorporated by reference. This application is also a Continuation-in-part of U.S. patent application Ser. No. 10/030,465, filed Jan. 8, 2002, entitled "Threat Identification for Mass Spectrometer System", U.S. Pat. No. 6,822,222, issued Nov. 23, 2004 the contents of which are hereby incorporated by reference, which was the National Stage of International Application No. PCT/US01/16829, filed May 23, 2001, which application claims the benefit of: U.S. Provisional Application 60/208,877, filed Jun. 1, 2000, entitled "Field Portable Time-of-Flight Spectrometer System" of Michael P. McLoughlin et al., the contents of which are hereby incorporated by reference, and U.S. Provisional Application 60/207,907, filed May 30, 2000, entitled "Mass Spectrometer Threat Identification System" of C. Scott Hayek et al., the contents of which are hereby incorporated by reference.

STATEMENT OF GOVERNMENTAL INTEREST

This invention was made with Government support under Contract No. MDA972-01-D-0005; awarded by DARPA. The Government has certain rights in the invention.

FIELD OF THE INVENTION

The invention relates to mass spectrometry, mass spectrometers and applications thereof.

BACKGROUND OF THE INVENTION

Mass spectrometers provide a fundamental tool of experimental chemistry and have proven useful and reliable in identification of chemical and biological samples. Mass spectrometry is a technique used to determine the masses of molecules and specific fragmentation products formed following vaporization and ionization. Detailed analysis of the mass distribution of the molecule and its fragments leads to molecular identification. The combination of specific molecular identification and extreme sensitivity makes molecular spectroscopy one of the most powerful analytical tools available.

However, the typical mass spectrometer is confined to the laboratory or other fixed sites due to its relatively large size and weight, as well as its high power and cooling requirements. Thus, mass spectrometer technology has not been used as a field portable detection system. Other impediments to field use include the requirements for large amounts of fluids to collect and process samples. Field samples are often much smaller in quantity and detection of such small samples is often essential (for example, in the case of detection of a chemical or biological agent that is lethal at small doses). In addition, typical scanning mass spectrometers have high data acquisition times, which is also inconsistent with field use. Also, stationary and level mounting configurations of typical mass spectrometers are inconsistent with adaptation to field use. Rapid and frequent placement and replacement of a sample is often inconsistent with the vacuum design of the typical stationary mass spectrometer.

FIG. 1 is a schematic representation of a particular type of mass spectrometer, the linear time-of-flight ("TOF") mass spectrometer. Pulsed ultraviolet laser 10 is used to simultaneously desorb and ionize an analyte 12 from a probe 14. The laser 10 is triggered by a digital oscilloscope 16, which simultaneously marks the time, or otherwise initiates a timer. A potential difference across an extraction region serves to accelerate the ions into a drift region (typically on the order of 1 m in length) as shown. As they pass through the drift region, the ions disperse in time, with their flight times proportional to the square root of their respective masses. An ion detector 18 at the end of the drift region records the ion signals on a digital oscilloscope 16, thus providing detection times.

If there are ions of different masses, the different flight times will give rise to a number of detection times. The trigger time and the one or more detection times thus provide one or more flight time intervals which, as noted, are related to the mass of the ion. The mass of the ion is related to the flight time interval t as follows:

$$m=2(eV)(t/D)^2$$

where D is the drift region as shown in FIG. 1 and eV is the acceleration energy imparted by the potential difference in the extraction region.

Different masses are thus determined based on the different flight times t of the ions. The TOF mass spectrometer thus records the entire mass spectrum for every ionization event that occurs to the analyte 12. Unlike other types of mass spectrometers, a TOF mass spectrometer does not rely on a scanning mass analyzer and therefore does not experience loss of signal due to scanning. The TOF mass spectrometer is also one of the simplest chemical analyzers, comprising principally an ion source, field-free tube for a drift region, and an ion detector, as shown in FIG. 1.

In addition, the TOF mass analyzer is particularly suited to measure the mass of biomolecular ions by using matrix-assisted laser desorption/ionization ("MALDI"). With MALDI, the analyte 12 is mixed with an appropriate organic matrix, inserted into the ionization region (for example, in the region occupied by probe 14 of FIG. 1), and desorbed from the surface into the TOF drift region D. The matrix absorbs radiative energy from the laser 10 and undergoes a phase change from solid to gas. During the phase change, the analyte gains a $H+$ ion and is thus accelerated by the potential difference in the extraction region, in the manner described above. MALDI treatment is particularly advantageous for ionization of larger molecules because the matrix provides a buffer between the energy of the laser and the sample. This prevents the larger molecules from being broken into small fragments, where analysis of these larger fragments simplifies the identification of the analyte.

Although ions produced by MALDI can be measured on a variety of mass spectrometers, a TOF mass spectrometer is particularly qualified for MALDI applications because it has no theoretical upper mass limit. Thus, MALDI is especially suited to the desorption of the larger macromelocules required for the application of chemotaxonomic methods. Larger mass ions, such as proteins and fragments of DNA strands, are still readily processed since they only take more time to reach the detector. Consequently, both the absence of any scanning requirement and an unlimited mass range make TOF mass spectroscopy a popular method for biomolecular analysis using MALDI.

For example, recent development of TOF mass spectroscopy using MALDI has included the detection of biological weapons whose mass signatures are often found in the 10 to 100 kDa range. Another valuable application is its ability to identify peptides and proteins with very high specificity and sensitivity. This area has led to the commercial development of TOF mass spectrometers for drug development in the pharmaceutical industry. Such applications indicates that TOF mass spectrometers are also well suited for biological threat detection of mid-range toxins (on the order of 1000 to 50,000 Da) in which subfemtomole sensitivity is required.

The resolution that arises from the lack of scanning has been exploited in the laboratory for many years, and the additional advantages that arise due to the TOF mass analyzer's ability to measure the mass of biomolecular ions by using MALDI has been exploited for approximately 10 years. However, the linear TOF mass spectrometer is inconsistent with use as a field portable detection system. One problem associated with adapting a linear TOF mass spectrometer includes limitations relating to mass resolution. Mass resolution of the linear TOF mass spectrometer is expressed in time units as t/2t, where t is the total flight time and t is the peak width of each TOF mass peak in the recorded spectrum. (The peak width arises principally from a small spread of energy (eV∀$U_o$) imparted to ions of the same mass by the potential difference.) Therefore, assuming a constant peak width t for each ion packet (group of ions having the same mass, with the mentioned energy spread), a longer total flight time will produce a larger dispersion between ions of different masses and thus increased resolution. Accordingly, many linear TOF mass spectrometers have used long drift regions to maximize mass resolution. A long drift region, of course, is incompatible with use as a field portable detection system.

A variation of the linear TOF mass spectrometer, known as the reflector or reflectron TOF mass spectrometer, is as shown in FIG. 2. Like the mass spectrometer of FIG. 1, a laser 10 desorbs and ionizes an analyte 12, which is accelerated by the potential difference V across the extraction region and into the drift region. However, the ions travel into a reflector or reflectron region at the end of the drift region, which applies a voltage that increases linearly with distance that the ion penetrates the reflectron region (as shown in FIG. 2*a*). The ion reflector or reflectron generally comprises a series of equally spaced conducting rings that form a retarding/reflecting field in which the ions penetrate, slow down gradually, and reverse direction, thereby reflecting the ion's trajectory back along the incoming path, as shown in FIG. 2. Ions of a given mass pass into the reflector and are turned around at the same nominal depth within the retarding field. As shown in FIG. 2, however, the energy spread ∀$U_o$ for ions of the same mass having a nominal energy eV results in ions having the same mass penetrating the reflector slightly more or less than the nominal depth of an ion of energy eV. Because ions having a higher energy (and velocity) penetrate deeper into the opposing field, they spend more time in the reflectron and will lag slower ions having the same mass upon exiting the reflectron. However, the lagging ions exit the reflectron at a higher velocity and thus catch up with the slower ions. Thus, instead of continuing to disperse through the drift region (as in the linear TOF mass spectrometer), the reflectron imparts a focusing effect on the ions traveling in the drift region.

For the reflectron configuration of FIG. 2, the time of flight is given by:

$$t=(m/2\ eV)\exp(-1/2)\ [L_1+L_2+4d]$$

The voltage placed on the last lens element $V_r$ is generally slightly larger than the accelerating volgate V, so that the average penetration depth d will be slightly shorter than the reflectron depth. Using this geometry, first-order kinetic energy focusing at the detector 18 for ions having the same mass is achieved when $L_1+L_2=4d$.

Thus, the reflectron configuration tends to improve the resolution while also providing a more compact total drift region. However, the above description applies to ions formed during the laser pulse ("prompt" fragmentation), not to fragment ions formed after the laser pulse that are the product of either slow unimolecular decay or bimolecular collisions ("metastable" ions). If these late-forming fragment ions are created before they exit the extraction region, the resulting TOF mass peaks are asymmetrical in the time domain and exhibit skewed peak shapes. If, on the other hand, the metastable ions are formed during their flight through the drift region (e.g., by collision with background gas), they are called post-source decay (PSD) ions. PSD peaks in TOF mass spectrometer data are particularly prevalent among peptides (small fragments of proteins), due to their propensity to break the peptide linkage along the amino-acid backbone long after the initial acceleration. The PSD product ion peaks are thus attributable to amino-acid chain fragments of the original peptide precursor.

While detection of PSD ions can be useful in biochemical analysis due to the sequencing information they yield, detection of PSD ions can be difficult. Relying on the property that all ions acquire the same energy within the source, traditional TOF mass spectrometers function by causing dispersion of ion velocities proportional to the ions' respective masses. However, PSD product ions are formed during the drift period, thus their velocities equal that of their precursor. Hence, their energies, rather than their velocities, are dispersed in direct proportion to their masses. Under these circumstances, a linear TOF (such as that shown in FIG. 1) cannot detect the presence of product ions, since their arrival at the detector occurs simultaneously with that of their parent ions (i.e., no field gradient exists to separate the ions in time).

In addition, for the reflectron TOF mass spectrometer, the fragment of a PSD ion will retain half the initial kinetic energy of the precursor ion. Hence the fragment will penetrate only halfway into the reflector shown in FIG. 2. If the focal point has been selected so that the total TOF drift region $L=L_1+L_2=4d$, as described above, then d must be reduced by a factor of 2 for focusing of the fragment. L is consequently reduced to satisfy the focusing relationship, thus the focal point for the fragment is shifted closer to the reflector. Each PSD fragment ion (as well as the original ion) is therefore focused to a different point in space.

In several commercial TOF instruments, focusing across the entire PSD spectrum is accomplished by stepping the voltage of the reflectron using 10 to 20 reflectron segments. The reflector voltage is decreased for successive laser desorption and ionization of the analyte; thus, progressively lower mass portions of the PSD spectrum are focused as the reflector voltage is decreased. The entire spectrum is then reconstituted by "stitching" together the individual spectral fragments, in effect, constructing a unified spectrum using the successive segments. This brute-force method of acquiring PSD spectra has the effect of converting the TOF mass spectrometer into a scanning instrument. This defeats a primary strength of the TOF mass spectrometer, namely the ability to rapidly acquire a complete mass spectrum without the need for any type of scanning procedure. As a result, precious sample may be consumed by the laser desorption process during the time required for the reflectron scanning process. Calibration is also difficult since each segment of the PSD spectrum corresponds to a different calibration curve. Additional power is also consumed.

A TOF mass spectrometer having a reflectron with an electric field determined by the equation for a circle, as shown in FIG. 2*b* provides focal points that are considerably closer to one another, thus enabling the recording of ions (as well as PSD fragments of ions) over the entire mass range at high resolution from a detector located at one position in the focal region. This electric field may be accomplished by tailoring the voltages to the plates comprising the reflectron so that the voltage magnitudes for successive plates increase in accordance with the equation of a circle. Further details of such a nonlinear reflectron TOF mass spectrometer is described in U.S. Pat. No. 5,464,985 to Cornish et al., entitled "Non-linear Field Reflectron", issued Nov. 7, 1995, the contents of which are hereby incorporated by reference.

Existing methods for association of mass spectral peaks with threat substances either rely on amplitudes of mass spectral peaks, which is non-specific when using the matrix assisted laser desorption (MALDI) approach, employ heuristic rules, or use knowledge networks that can consume significant set-up and computation time. Additionally existing approaches do not utilize robust peak detection algorithms for real-time, highly accurate decomposition of a continuous spectrum into a bi-valued "peaks present" spectrum.

Such existing methods include an earlier rule-based system proposed by S. Hayek and W. Doss of Johns Hopkins University Applied Physics Laboratory (JHU/APL), a "Bayesian Belief Network" approach suggested by A. Feldman and J. Lin of (JHU/APL), a "Weighted Training Set Classification" approach suggested by N. Beagley, K. Wahl, S. Wunschel, K. Jarman of Pacific Northwest National Laboratory, and a "Hyperspace Feature Vector Projection" approach suggested by T. Falcone of Alphatech.

One difficulty with both a linear and nonlinear reflectron TOF mass spectrometer is their use with ions having a relatively large mass. All ions lose some of their velocity in the reflectron. Particles having a large mass have a relatively slow initial speed. These particles are relatively slow moving and lose a portion of that velocity in the reflectron. Thus, detection of these ions requires the detector have a higher sensitivity, which also requires more sampling in order to distinguish from background noise.

In addition to these particular problems that render known TOF mass spectrometers inconsistent with a field portable detection system, any attempt to adapt TOF mass spectrometers to such use would also have many of the other difficulties described above for such use of mass spectrometers in general. These include the stationary and level mounting configurations of typical designs that is inconsistent with field use, vacuum designs that are often inconsistent with the need for rapid and frequent placement and replacement of samples in field use, as well as other impediments.

In addition, there is typically an abundant sample available for analysis in TOF and other mass spectrometers located in a laboratory. Thus, a highly resolved spectrum may be achieved by repeated ionization and detection of the analyte. By contrast, in the field, only a small and diffuse sample may be available for collection from the environment. In addition, for a laboratory mass spectromenter, the samples are often prepared in a liquid state and placed in the extraction region. Because the extraction region of a typical laboratory mass spectrometer is relatively large, the small protrusion of such a liquid sample into the extraction region does not provide a substantial impact on the acceleration of the emitted ions. However, if such a liquid sample were used in a more compact extraction region of a mass spectrometer adapted for portable field use, the protrusion would affect the resulting energy imparted to the ions. In addition, liquid sample preparation in a field adapted mass spectrometer would be susceptible to freezing, spoiling, etc.

SUMMARY OF THE INVENTION

Among other things, it is thus an object of the invention to provide a field portable detection system that uses a mass spectrometer. It is an object to provide such a field portable detection system that reliably and rapidly detects small levels of biological and chemical samples that are found in the field. In addition to short analysis times (for example, less than 5 minutes), it is an objective to provide a system that has high sensitivity, wide agent bandwidth, portability, low power consumption, minimal use of fluids, extended unattended operation and automated detection and classification.

Still another object of this invention is to automatically determine if a matrix assisted laser desorption (MALDI) time-of-flight mass spectrometer (TOF-MS) has encountered a threat substance, by computing the likelihood of the observed "peak present" spectrum (a multivariate Bernoulli random variable), given an existing threat library. Both the library and the computation of likelihood are derived from probabilities of observing individual peaks in the spectrum. This determination is robust to "noise" in the MALDI mass spectrum, e.g., baseline shifts and randomness in spectral peak heights.

In using a mass spectrometer for such detection, it is an objective to rapidly collect, pre-treat and transport the sample into the sample region of the mass spectrometer. Among other things, it is an objective to provide a vacuum configuration that allows for rapid placement and re-placement of the sample within the spectrometer.

It is also an objective to provide such a field portable detection system that uses a TOF mass spectrometer. It is an objective to provide a TOF mass spectrometer that has a compact drift region and that time focuses PSD fragments of a precursor without a scanning mechanism. It is also an objective to provide rapid and reliable molecular identification by applying identification processing (for example, algorithms and rules) to the raw spectrometer data provided by a field sample.

In accordance with these objectives, the invention provides a field portable mass spectrometer system comprising a sample collector and a sample transporter. The sample transporter interfaces with the sample collector to receive sample deposits thereon. The system further comprises a time of flight (TOF) mass spectrometer. The time of flight mass spectrometer has a sealable opening that receives the sample transported via the sample transporter in an extraction region of the mass spectrometer. The system further comprises a control unit that processes a time series output by the mass spectrometer for a received sample and identifies one or more agents contained in the sample.

The sample collector may comprise, for example, an inlet having a vacuum therein, the inlet collecting an environmental specimen via the vacuum. The sample transporter may comprise a tape that receives the sample deposits from the sample collector, the tape being received at the sealable opening of the mass spectrometer. This allows a sample thereon to be received in the extraction region of the mass spectrometer.

The sealable opening and the extraction region of the TOF mass spectrometer may be, for example, provided in a housing of the TOF mass spectrometer. The housing may further comprise a roughing vacuum chamber portion that extends from the sealable opening of the housing to a vacuum valve. The housing may further comprise a removable cover that is engageable with the sealable opening, the removable cover and the sealable opening forming a vacuum seal when engaged. A roughing pump may interface with the roughing vacuum chamber portion and serve to evacuate the roughing vacuum chamber portion when (a) the vacuum seal is formed between the removable cover and the sealable opening and (b) the vacuum valve is closed. The extraction region may be located in the roughing vacuum chamber portion and the drift region of the TOF mass spectrometer may extend from the roughing vacuum chamber portion through the vacuum valve and into a main mass spectrometer vacuum chamber. The main mass spectrometer vacuum chamber may comprise at least a part of the drift region, a detector and a reflectron. A turbo or other high vacuum pump that interfaces with the main mass spectrometer vacuum chamber may serve to evacuate the main mass spectrometer vacuum chamber. The turbo or other vacuum pump may also serve to evacuate the main mass spectrometer vacuum chamber and the roughing vacuum chamber portion when the valve is opened, thereby providing a connected vacuum between the main mass spectrometer vacuum chamber and the roughing vacuum chamber portion when the valve is opened.

The TOF mass spectrometer may comprise a linear TOF mass spectrometer and a reflectron TOF mass spectrometer. The electric field in the nonlinear reflectron may be substantially determined by the equation of a circle.

The invention also comprises a controller that processes the mass spectrum of a sample provided by a detector of a mass spectrometer, for example, by a field portable mass spectrometer system. The controller provides a constant false alarm rate (CFAR) processing of the mass spectral data received. The CFAR processes the mass spectral data to determine noise included in the mass spectral data and outputs spectral peaks when the mass spectral data exceeds a threshold that reflects the noise included in the spectral data. The output peaks are compared with spectral peaks for known threats stored in a database and a notification that a known threat is present in the sample is provided if there is a correspondence between one or more output spectral peaks and one or more spectral peaks of a known threat as stored in the database.

The processing of the mass spectral data by the CFAR to determine noise included in the mass spectral data may, for example, comprise determining an estimate of the noise for a sample test cell of the mass spectral data. The determination of when the mass spectral data exceeds a threshold that reflects the noise included in the spectral data may further comprise determining whether the mass spectral data for the sample test cell exceeds the threshold. Determination of the threshold value may comprise substituting the noise estimate in a noise distribution for the mass spectrometer.

The spectral peaks for known threats stored in the database may have a corresponding ranking code. After the comparison by the processor of the output peaks with spectral peaks for known threats stored in a database determines that one or more output peaks corresponds to one or more spectral peaks for a known threat, then the one or more ranking codes of the corresponding one or more spectral peaks for the known threat may be used to determine whether the known threat is present in the sample.

BRIEF DESCRIPTION OF THE DRAWINGS

FIG. 1 is a schematic representation of a known linear TOF mass spectrometer;

FIG. 2 is a schematic representation of a known reflectron TOF mass spectrometer;

FIG. 2*a* is a graph of the voltage versus distance of a linear electric field provided by the reflectron element of the TOF mass spectrometer of FIG. 2;

FIG. 2*b* is a graph of the voltage versus distance of a nonlinear electric field provided by the reflectron element of the TOF mass spectrometer of FIG. 2;

DETAILED DESCRIPTION

Figures 1A, 3:
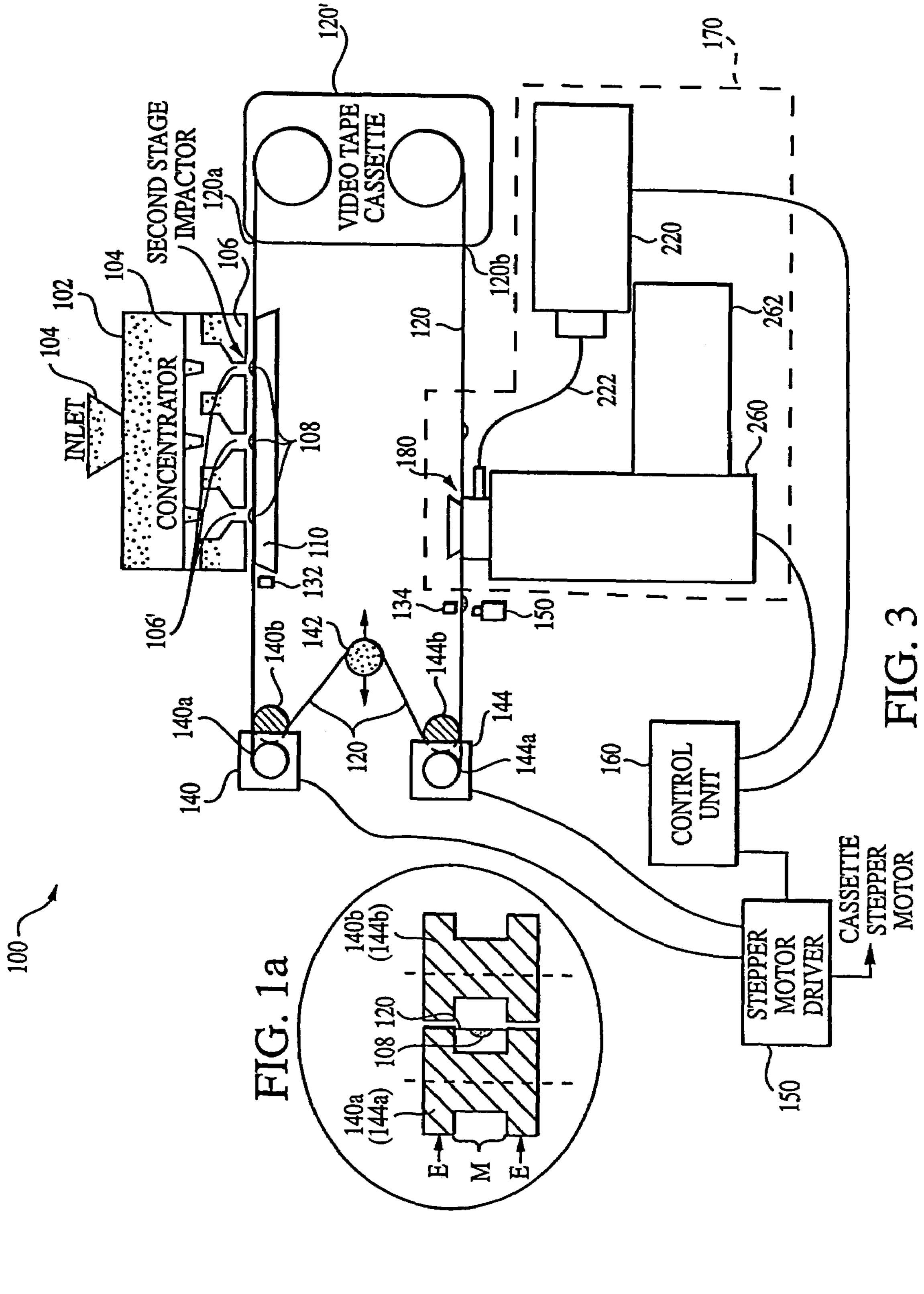
FIG. 3 is a schematic diagram of an embodiment of the system of the present invention.

Referring to FIG. 3, the principle components of an embodiment of the system 100 of the present invention are shown. The components of the system 100 may be mounted atop a portable platform, within a carrying case, etc. As will become evident below, the system 100 is designed to run automatically. That is, it may be placed in where detection of chemical or biological agents is desired, and it will sample the environment and analyze and identify such agents on an ongoing basis.

Air or other environmental specimen is drawn (via a vacuum) into a collector 102 via an inlet 104. Upon entering the collector 102, the specimen passes through a concentrator 104 and a second stage impactor 106. The impactor 106 serves to separate particles from the airflow and provide sample deposits 108 on a transport tape 120 (described further below) through a number of impaction nozzles 106'. The air collection portion so configured has a high throughput and high collection efficiency. Thus, a high concentration of dry particles are withdrawn from the environment and deposited on a small area of the tape 120 as samples 108, as shown. The collector 102 therefore collects particulate agents from the environment, such as biological agents and chemical agents that are attached to particles (such as residue of explosive material in the earth left by mine placement). Thus, samples 108 are not collected or transported in a liquid state, thus avoiding freezing, spoiling, etc. In addition, samples 108 deposited on the tape 120 are extremely thin, which is advantageous when introduced into the extraction region of the mass analyzer, as described further below.

Collection of the sample may be improved by using a pulsed infrared laser adjacent the inlet 104 and directed at the surface suspected of being contaminated or containing a specimen. The laser is optimized in wavelength, power and pulse width to that is optimized to the compound of interest. By applying a threshold power that is sufficient to thermalize the suspected chemical or biological agent into vapor, other less volatile components remain in the solid phase and thus do not contribute to background readings in the analysis. A control unit 160 (introduced further below) may tune the laser to a wavelength and power that corresponds to a compound input by a user (via, for example, a GUI and menu that interfaces with software in the control unit 160). It may also adjust associated focusing optics (for example, by providing control signals to a stepper motor associated with focusing lenses) in order to provide the power and focusing of the laser light required for the suspected compound. A number or category of suspected compounds may also be input and the laser is tuned in succession to pulse at various wavelengths and powers associated with each while the sample is being collected. The lenses may also be adjusted in succession. Alternatively, the wavelength, power and lens position may be adjusted to one setting that takes into account each suspected compound (for example, by averaging). Pulsed laser sampling is described in further detail in U.S. Provisional Patent Application Ser. No. 60/208,089, entitled "Pulsed Infrared Laser Sampling Methodology For Time-Of-Flight Mass Spectrometer Detection Of Particulate Contraband Materials" of inventor Wayne A. Bryden, filed May 31, 2000, also owned by the assignee of the present invention. The contents of U.S. Provisional Patent Application Ser. No. 60/208,089 are hereby incorporated by reference.

After collection, the samples 108 are transported by the tape 120 for treatment and analysis. The tape 120 may be a standard VHS tape, which is withdrawn from a tape supply end 120*a* of a videocassette 120' and collected at the tape collection end 120*b*. The videotape 120 from the tape supply side 120*a* lies below the impaction nozzles 106' (from which the samples 108 are deposited, as described above) and a base 110. Base 110 is movable away from the main portion of collector 102 (for example by a stepper motor that receives control signals from a control unit 160 (described below)), thereby allowing the tape 120 to be moved without disturbing the collected samples 108. The tape 120 is wound in a loop pattern between the drive shaft 140*a* and a rubber tape roller 140*b* of a first stepper motor 140, around a tensioning rubber tape roller 142, and between a drive shaft 144*a* and a rubber tape roller 144*b* of a second stepper motor 144. The tape 120 then passes through an input portion to the mass analyzer 180, as described in more detail below, and is then collected by the cassette 120' at the tape collection end 120*b*.

Referring to FIG. 1*a*, a side cross-section of the drive shafts 140*a*, 144*a* and the rubber tape roller 140*b*, 144*b* is shown, with the tape 120 therebetween. As shown, both the drive shafts 140*a*, 144*a* and the tape rollers 140*b*, 144*b* have a reduced diameter at a mid region M than at end regions E. The end regions E between the drive shafts 140*a*, 144*a* and the tape rollers 140*b*, 144*b* serve to pinch the edges of the tape 120, while the middle region M allows the sample 108 to pass through untouched. The friction created by pinching the tape 120 between the drive shafts 140*a*, 144*a* and the tape rollers 140*b*, 144*b* allows the drive shafts 140*a*, 144*a* to advance the tape 120.

Driving of the tape uses commercially available stepper motor drivers for the positioning of the tape. The embodiment of FIG. 3 includes a three axis stepper motor driver 150 that receives control signals from control unit 160. The stepper motor driver 150 independently controls first stepper motor 140, second stepper motor 144 and a third stepper motor (not shown) that serves to load the video cassette 120'. By sending the appropriate control signals to the first stepper motor 140, a portion of the tape is positioned in the collector 102. By sending appropriate control signals to the second stepper motor 144 and coordinating simultaneous collection of the tape into the cassette by the third stepper motor, samples 108 may be positioned in the mass spectrometer vacuum interface 180. Thus, the tape segment associated with the collection of the samples 108 moves independently of the segment associated with the analysis of the samples 108. Thus, additional samples may be collected by the collector 102 while a particular sample continues to be analyzed by the mass spectrometer 170. When the analysis is completed, the second stepper motor 144 is stepped by the control unit 160 along with the third stepper motor to move the next sample into the mass spectrometer vacuum interface 180. Likewise, a sample may continue to be collected by collector 102 while a previously collected sample is moved into the mass spectrometer vacuum interface 180. When the sample collection is completed, the first stepper motor 144 is stepped by the control unit 160 to move fresh tape into the collector 102 for collection of a subsequent sample. Tension is maintained in the tape 120 during independent movement of stepper motors 140, 144 because roller 142 moves against spring tension as required in the directions of the arrows shown in FIG. 3 associated with roller 142.

The stepper motors 140, 144 (as well as the cassette stepper motor) may, of course, also be stepped together to position a collected sample 108 from the collector 102 to the mass spectrometer vacuum interface 180. This may occur, for example, if the sampling is initiated manually (for example, by a security office at an airport gate), or during automatic collection and processing where the analysis of the last sample has been completed before collection of the subsequent sample is completed. In either case, the control unit 160 keeps track of the movement of each sample 108 leaving the concentrator 102 by using magnetic write head 132 to write a reference marking on the tape 120 adjacent the exiting sample 108. As described below, a read head prior to the mass analyzer is used to identify and provide a position of the sample 108 to the control unit 160. (Alternatively, an optical writer and reader, for example, may be used.) Thus, the control unit 160 does not need to keep track of the position of the sample 108 while being transported between the collector 102 and the mass spectrometer vacuum interface 180. (Keeping track of the position of the samples also allows, for example, collection of multiple spots. The field analysis of some of these spots may be skipped, and the untouched sample may be retained for later analysis in a laboratory.) For ease of description, the ensuing description will focus on the collection of a single sample 108 by the collector 102 and its treatment, transport and analysis by the field portable mass spectrometer system 100.

After collection of sample 108 by collector 102, association of a reference marking by write head 132 and movement of the sample 108 through the tape loop of the stepper motors (described above), a magnetic read head 134 reads the reference marking on the tape 120 associated with sample 108 provided by write head 132. This identifies the sample 108 to the control unit 160 and also provides a reference position for subsequent movement by the control unit 160. Using the reference position, the control unit 160 steps stepper motor 144 by a known amount to position sample 108 adjacent the nozzle of a MALDI micro sprayer 150. MALDI micro sprayer 150 adds a small amount of MALDI matrix or other sample treatment to the sample to facilitate ionization in the mass spectrometer 170 (described below), especially for desorption of large macromolecules previously described. The MALDI treatment provides a small amount of matrix, thus the sample 108 remains relatively flat. The MALDI micro-spray does not create a liquid sample; instead the fine mist enables the matrix material to bind with the sample 108. In addition, the MALDI treatment occurs just prior to introduction into the mass analyzer, thus avoiding exposure to the elements and possible freezing, spoilage, etc.

The control unit 160 then steps stepper motor 144 by a known amount to move treated sample 108 into the mass spectrometer 170. The software run by the control unit 160 and the stepper motors position the sample 108 within 0.1 mm in the sample target region of the mass spectrometer 170, thus ensuring that the sample 108 is illuminated with the laser, as described further below.

The mass spectrometer 170 shown in FIG. 3 comprises ionization grid and vacuum interface 180, mass spectrometer vacuum chamber 260 and associated turbo pump 262 (for evacuating mass spectrometer vacuum chamber 260), and ionizing laser 220. Since components of the mass spectrometer (housed in elements 180 and 260 as described below) of the system must be housed in a high vacuum chamber, introduction of a sample 108 requires that the vacuum seal be broken and re-sealed while the tape 120 is moved to position the sample 108 in the mass spectrometer 170.

Figure 4:
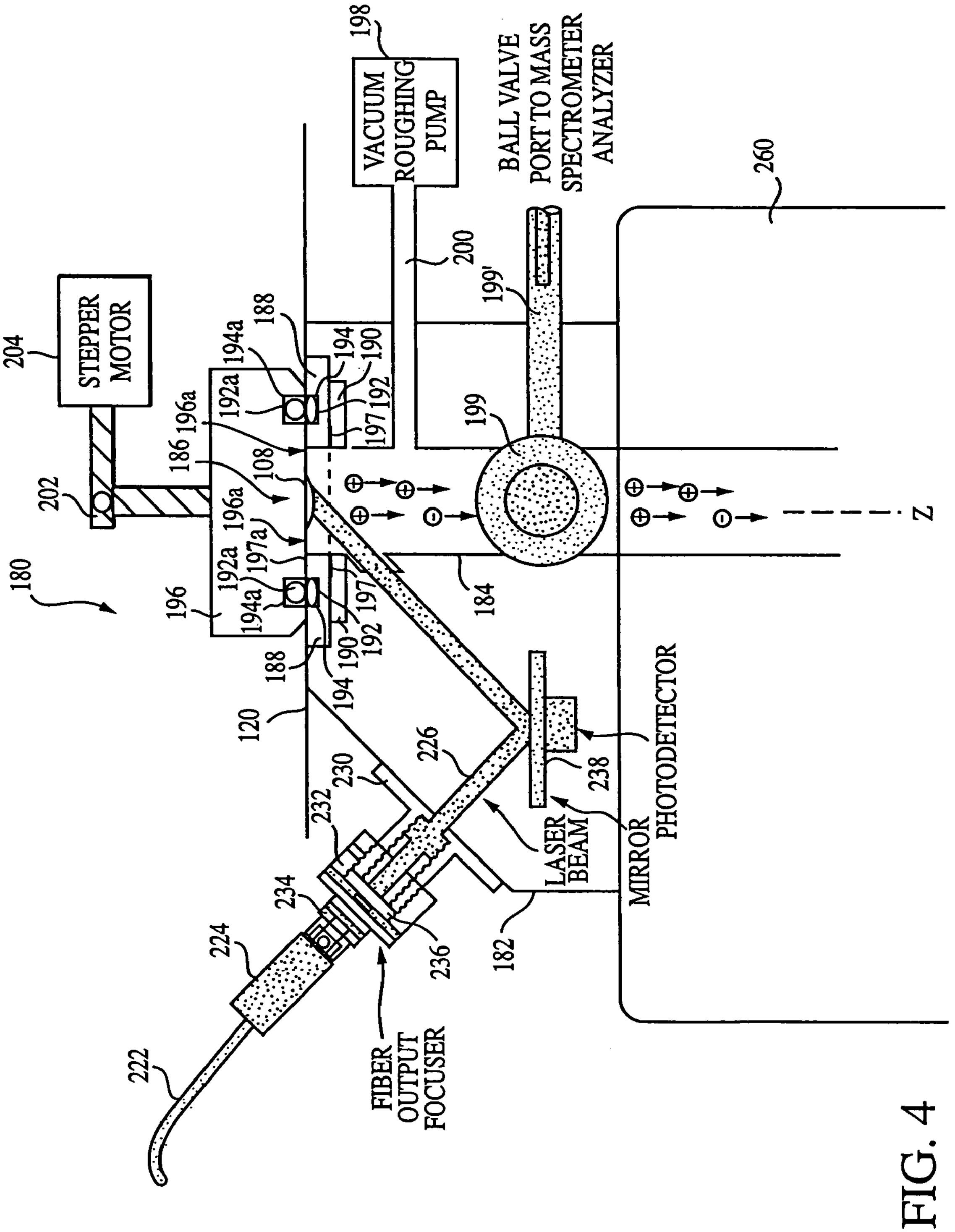
FIG. 4 is cross-sectional diagram of an ionization grid and vacuum interface portion of the system of FIG. 3.

Referring to FIG. 4, additional details of the ionization grid and vacuum interface 180 of the mass spectrometer 170 is shown. The interface 180 comprises housing 182 having a roughing vacuum chamber portion 184 therein. A sample 108 is introduced into the vacuum system of the mass analyzer by moving tape 120 so that sample 108 is positioned in upper opening 186 of roughing vacuum chamber portion 184. An insulating disc 188 surrounds the upper opening 186 and is supported by flange 190 that projects axially from the roughing vacuum chamber portion 184. The upper surface of the insulating disc 188 is flush with the upper surface of the housing 182, thus providing an even surface across which tape 120 extends. An O-ring 192 is positioned in circumferential groove 194 in the surface of the insulating disc 188.

With the sample 108 in position at the upper opening 186, a cover in the form of a platen 196 is positioned over the sample and the upper opening 186. Platen 196 is an insulating material with a thin electrode 197*a* on its bottom surface, described further below. The platen 196 has a circumferential groove 194*a* and O-ring 192*a* in its bottom surface opposite the circumferential groove 194 and O-ring 192 of the insulating disc 188. When the platen 196 is positioned as shown and the roughing vacuum chamber portion 184 is evacuated by the roughing pump 198 and turbo pump 262 as described in further detail below, the platen 196 is drawn downwards and the compression of O-rings 192, 192*a* creates a vacuum seal in the roughing vacuum chamber portion 184.

While the sample 108 is being positioned, the roughing vacuum chamber portion 184 is exposed to atmospheric pressure. A ball valve 199 is closed during the positioning process to isolate the high vacuum (micro-Torr) in the mass spectrometer vacuum chamber 260. This is done via a stepper motor (not shown) associated with the ball valve 199 that receives commands from the control unit 160 when a new sample 108 is to be positioned. The roughing pump 198 is switched off by the control unit 160 and the vacuum in roughing vacuum chamber portion 184 rises to atmospheric pressure. Control unit 160 moves platen 196 away from upper opening 186 in the Z direction by sending the appropriate stepping signals to stepper motor 204, which removes platen 196 via cantilever arms 202. Stepper motor 144 is then stepped by control unit 160 so that tape 120 positions sample 108 in upper opening 186. Because the sample 108 is dry and flat, it remains intact even if it engages the top surface of housing 182 and insulating disc 188 during positioning.

When the sample 108 is positioned, the stepper motor 204 is stepped by control unit 160 to positioned platen 196 against insulating disc 188 with O-rings 192, 192*a* mating as described above. Referring momentarily back to FIG. 3, one or more pins (not shown) protruding from base 110 pierces tape 120 at piercing points 196*a* (see FIG. 4) adjacent sample 108. As seen, piercing points 196*a* are closer to the circumference of opening 186 so that they do not interfere with the sample 108. Control unit 160 initiates a vacuum roughing pump 198, which evacuates the roughing vacuum chamber portion 184 through port 200. The piercing of tape 120 provided by piercing points 196*a* facilitate the evacuation of any gas trapped between the tape 120 and the platen 196. The ball valve 199 is then opened and the vacuum in the roughing vacuum chamber portion 184 is connected with the vacuum in the mass spectrometer vacuum chamber 260, which, as described below, is maintained in the micro-Torr range by a turbo pump. The seal between the platen 196 and the O-ring 192 has a leak rate of less than $10^{-7}$ cc/s, which is well within the capability of the turbo pump to maintain the required micro-Torr vacuum.

Referring back to FIG. 3, laser 220 is used to ionize the sample 108 positioned as shown in FIG. 4. In the embodiment, laser 220 is a 300 □J pulsed UV laser. The laser light is delivered to the ionization grid and vacuum interface 180 by fiber optic transmission channel 222, thus providing for rugged use. A large diameter, multi-mode or specialized fiber core is used because it has a greater ability to accept and thus maximize input power than a small diameter, single-mode optical fiber core. The output beam pattern of a multimode fiber from a highly coherent light source is not Gaussian as is the case for a single-mode fiber. The beam pattern is a time and position varying "speckle" pattern that is dependent on the number of propagating modes. However, the large number of propagating modes minimizes any associated effects in the ionization of the sample, described below. The fiber optic is a fused silica multimode fiber with a 100 □m core and a 140 □m cladding.

At the laser 220 side of the fiber optic 222, there is combined output coupler and power attenuator, which are well-known in the art and thus not depicted for convenience. The output coupler is a series of lenses, which focuses the beam produced by the laser (on the order of 5 mm by 7 mm) into the optical fiber core. Power coupling efficiency varies from 20% to 90% depending on the lens configuration and size of the optical core. For the above-described fiber optic there is an input power coupling efficiency on the order of 80%. This provides a compromise between coupling efficiency and the fiber flexibility needed for packaging.

As noted, the laser 220 side of the fiber optic 222 also includes a variable power attenuator for varying the output power. The attenuator comprises a stepper motor that controls the position of a variable position screw, and which is adjustable by the stepper motor to partially block the output of the beam prior to passing through the output coupling lenses described above. The stepper motor associated with the variable position screw, and thus the degree of attenuation provided by the attenuator, is controlled by control unit 160. The attenuation range is continuously variable from 0 dB to 30 dB. Both ends of the fiber optic, the attenuator and the output coupler have standard FC/PC connectors.

The opposite end of the optical fiber 222 interfaces with the ionization grid and vacuum interface 180 of the mass spectrometer 170 as shown in FIG. 4. Housing 182 includes optical port 230. Cap 232 screws onto port 230. The top of cap 232 has an opening along the axis of the port 230, and an FC PC connector 234 projects therefrom and receives the FC/PC connector 224 of the optical fiber 222. A focuser 236 comprised of a variable position biconvex lens is supported or fixed to the inside of cap 232. The cap 232 has an associated stepper motor (not shown) that receives control signals from the control unit 160, thus allowing the control unit 160 to adjust the focal length of focusing lens 236 by moving the cap 232 and lens 236 affixed thereto.

As seen in FIG. 4, laser light 226 emitted from the fiber 222 enters housing via port 230, and is reflected by mirror 238 so that it is incident on sample 108 positioned in optical port 240 of roughing vacuum chamber portion 184. The optical port 240 has a translucent surface that allows the laser light to enter the roughing vacuum chamber portion; thus, the portion of housing 182 that houses mirror 238 and photodetector 239 is not under vacuum. The distance from the focuser 236 to the sample 108 to be ionized is thus fixed. The magnification of the focuser is nominally 6.5 at 76 mm. The spot diameter of the light output by the fiber 222 is nominally 0.65 mm diameter due to the size of the fiber core and the distance of the core from the lens of the focuser 236. The spot diameter can thus be readily focused to a diameter from 0.5 mm to 1.0 mm at the sample 108.

As noted, the settings of both the attenuator and the focusing lens 236 are controlled by control unit 160 via associated stepper motors. The control unit 160 may thus provide a spot size and an intensity that is matched to the size of the molecule of a suspected sample type. Alternatively, the spot size and intensity may be stepped through various intensities and sizes for a sample 108, in order to provide good ionization of an unknown sample.

One skilled in the art will readily recognize that the fiber optic may be replaced by fixed optical elements (for example, reflecting surfaces and lenses) to direct the light emitted by the laser 220 onto the sample 108. An attenuator and focusing lens (or lenses) may also be readily incorporated into such an alternative arrangement.

The previously mentioned pulsed laser methodology described in the Bryden U.S. Patent Application Ser. No. 60/208,089 referred to above (entitled "Pulsed Infrared Laser Sampling Methodology For Time-Of-Flight Mass Spectrometer Detection Of Particulate Contraband Materials") may also be used to improve the ionization of the sample from the tape 120. As in its application to the sampling front end, the laser is optimized in wavelength, power and pulse width to provide a degree of specificity for the chemical or biological agent of interest. By applying a threshold power that is sufficient to thermalize the suspected compound into vapor, there is a more efficient ionization of suspected compound (if present in the MALDI matrix) than other less volatile components. Control unit 160 may tune the laser 220 to a wavelength and power that corresponds to a compound input by a user (via, for example, a GUI and menu that interfaces with software in the control unit 160). It may also adjust the focuser 236 (for example, by providing control signals to a stepper motor associated with cap 232 and/or attenuator screw) in order to provide the power and focusing of the laser light required for the selected compound. A number or category of suspected compounds may also be input and the laser may be tuned in succession to pulse at various wavelengths and powers associated with each while the sample is being collected. The lens may also be adjusted in succession. Alternatively, the wavelength, power and lens position may be adjusted to one setting that takes into account each selected compound (for example, by averaging).

As described above, the sample 108 is moved into position as shown in FIG. 4, a vacuum seal is created between O-rings 192, 192*a*, the roughing vacuum chamber portion 184 is first evacuated by roughing pump 198 with ball valve 199 closed, and then by turbo pump of the mass spectrometer vacuum chamber 260 with the ball valve 199 open. Control unit 160 sends control signals to laser 220 and, as described above, laser light is pulsed through the fiber optic 222 and focuser 236 and into housing 182, and reflected by mirror 238 onto sample 108. The sample 108 is ionized by the incident laser light, which may also involve adjusting or stepping the settings associated with the attenuator and/or the focusing lens 236.

The electrode 197*a* on the bottom surface of platen 196 is maintained at a voltage on the order of 4.6 kV and thin grid plate 197 inserted between flange 190 and insulating disc 188 is maintained at ground. This creates a ground plane across roughing vacuum chamber portion 184 as shown by the dotted line. Thus, the ions released from the sample 108 are accelerated by the potential difference and travel down the axis labeled Z of the roughing vacuum chamber portion 184 and into the mass spectrometer vacuum chamber 260. The segment of the roughing vacuum chamber portion 184 between the electrode 197*a* of the platen 196 and thin plate 197 serves as the extraction region of a TOF mass spectrometer. The segment of the roughing vacuum chamber portion 184 below thin plate 197 is part of the drift region of the TOF mass spectrometer. (Additional components and the operation of the TOF mass spectrometer configuration will be described in more detail below with respect to FIGS. 5–6.) A series of electrodes (not shown in FIG. 4) surrounding the Z axis between the extraction region and the ball valve 199 serves to focus the ions along the Z axis.

Figure 5:
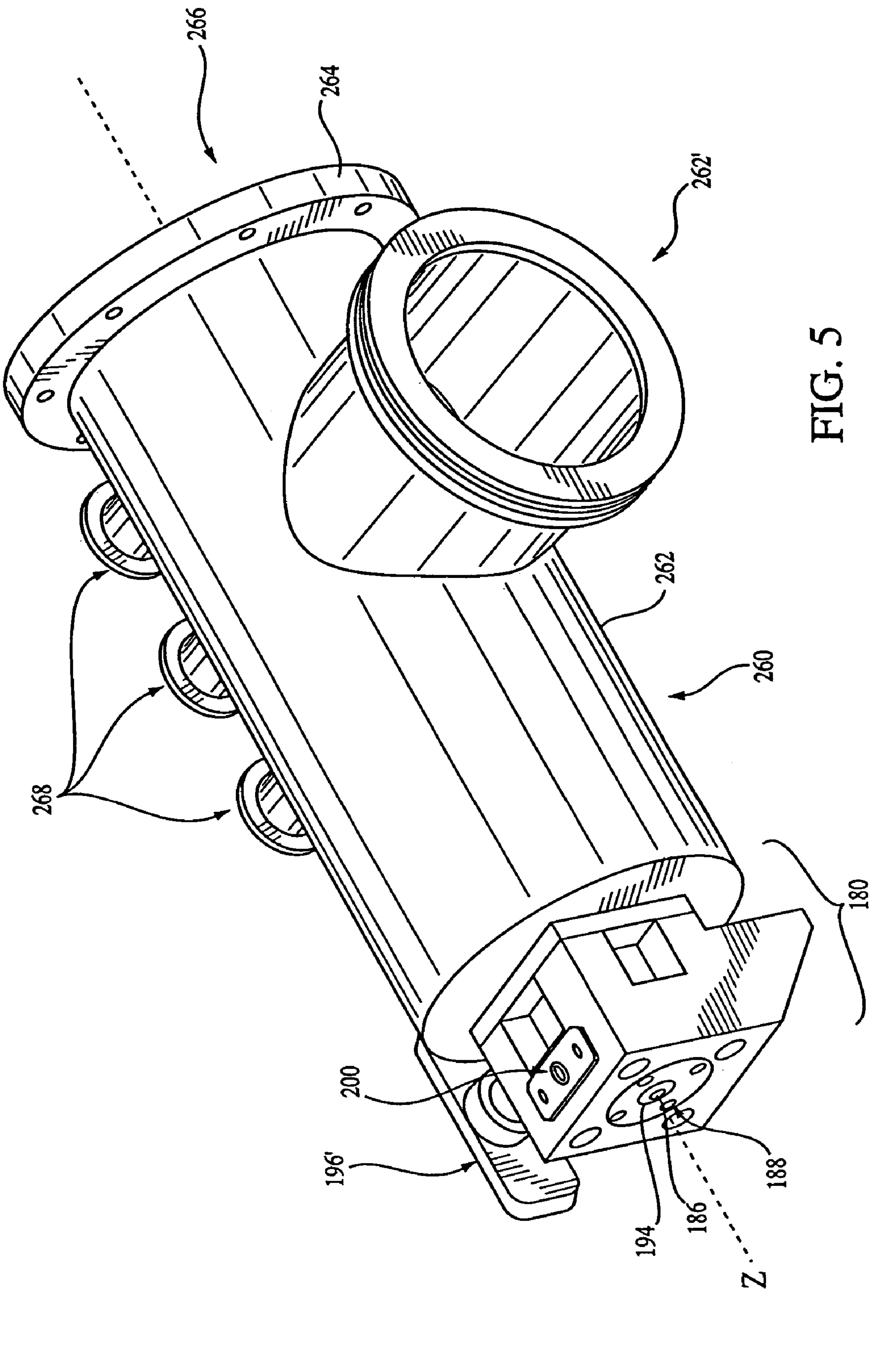
FIG. 5 is a partial perspective view of the ionization grid and vacuum interface portion and a mass spectrometer vacuum chamber portion of the system of FIG. 3.

Referring to FIG. 5, a partial perspective view of the ionization grid and vacuum interface 180 and mass spectrometer vacuum chamber 260 is shown. Aspects of the ionization grid and vacuum interface 180 include the insulating disc 188, groove 194, upper opening 186 of roughing vacuum chamber portion 184, roughing pump port 200 and port 199' for ball valve 199. The axis Z referred to in FIG. 4 (which is the nominal drift axis of the accelerated ions) is also shown in FIG. 5 as running through the center of the ionization grid and vacuum interface 180 and mass spectrometer vacuum chamber 260. The external housing 262 of the mass spectrometer vacuum chamber 260 is a ruggedized vacuum housing made of stainless steel. Bottom opening 266 of housing 262 receives an internal frame 280 that supports additional structure of the TOF mass spectrometer, as described with respect to FIG. 6 below. An end cap 284 of internal frame 280 interfaces with end flange 264 of housing 262 and uses piston-type o-ring seals to provide a vacuum seal. ISO-NW flanges for three evenly-spaced access ports 268 also provides highly reliable sealing for the vacuum chamber provided by the housing 262.

Turbo pump port 262' provides a standard vacuum interface for turbo pump 262, which evacuates the housing into the micro-Torr region. The pump-down time, and hence power requirements of the chamber are reduced by adopting a cylindrical design with as little internal volume as possible.

Figure 6:
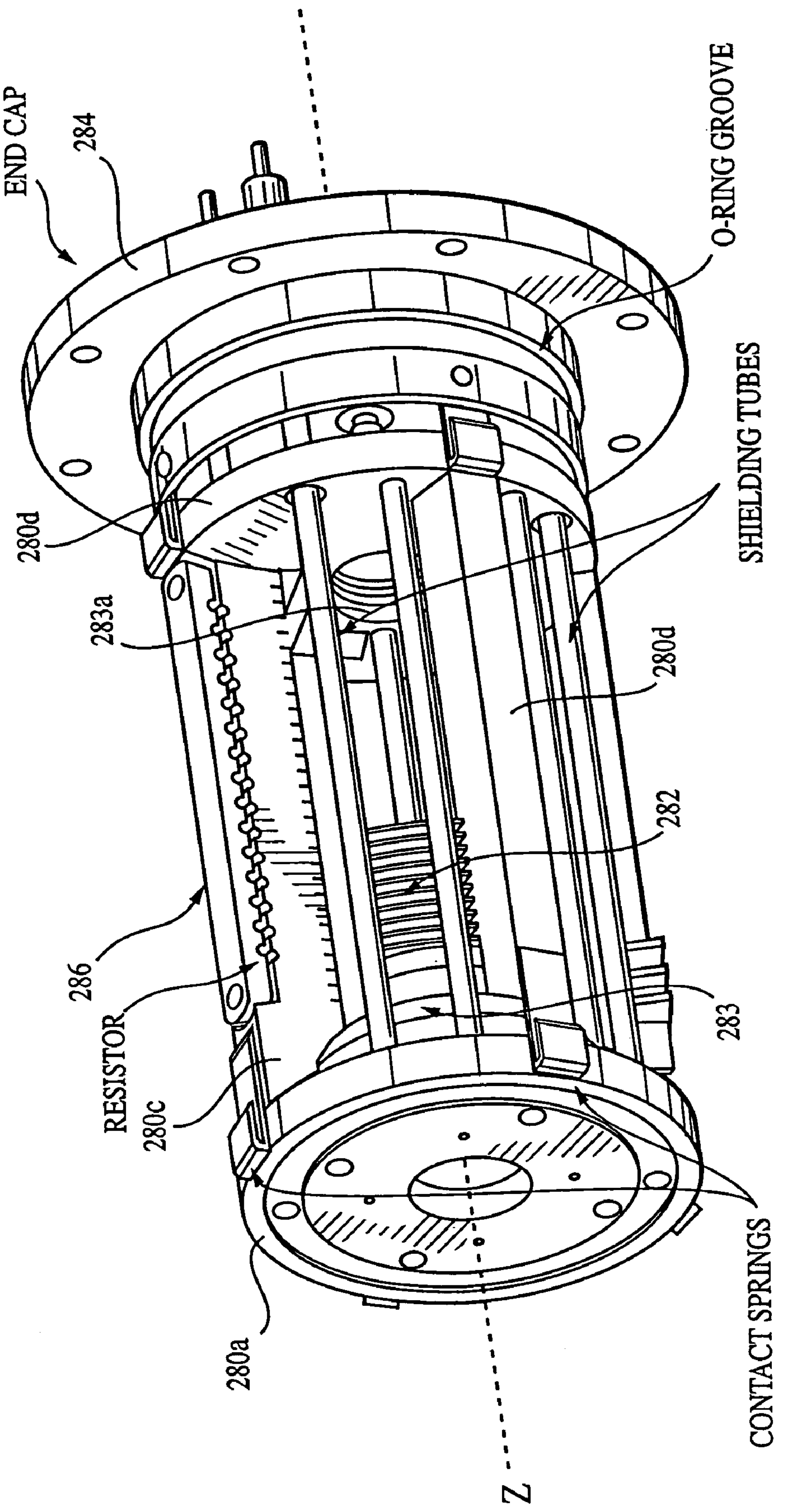
FIG. 6 is a perspective view of the internal structure of the mass spectrometer vacuum chamber portion shown in FIG. 5.

FIG. 6 shows the internal structure of the mass spectrometer vacuum chamber 260. The internal frame 280 is principally comprised of end discs 280*a*, 280*b* connected by four rails 280*c*, 280*d* (the other two being obscured by the view of FIG. 6) separated by 90° around the central axis of the frame. The internal frame 280 is made of polycarbonate, which provides high impact strength, ease of machining, low cost and relatively low out-gassing properties.

As noted above, a portion of the TOF mass spectrometer is comprised of the ionization grid and vacuum interface 180, namely the extraction region (between platen 196 and thin grid plate 197 of FIG. 4) and a portion of the drift region (below thin grid plate 197 of FIG. 4). Thus, the mass spectrometer vacuum chamber 260 is referred to as such because it includes many of the components of the mass spectrometer (described immediately below). However, it is understood that this terminology is a convenient reference and does not indicate a strict demarcation of the mass spectrometer components. It is also again noted that, when the spectrometer is in use, the vacuum in the ionization grid and vacuum interface 180 and the mass spectrometer vacuum chamber 260 is connected.

The axis Z referred to in FIGS. 4 and 5 (which defines the nominal drift axis of the accelerated ions) is shown in FIG. 6 as running through the center of mass spectrometer vacuum chamber 260. Comparison of FIGS. 5 and 6 demonstrates that end plate 280*a* is inserted first into the opening 266 of housing 260 and thus lies closest to ionization grid and vacuum interface 180. Thus, a hole in the center of end disc 280*a* further defines the drift region of the mass spectrometer, which extends further into the mass spectrometer vacuum chamber 260 along the Z axis and into the plates 282 of the reflectron, as described immediately below.

The mass spectrometer vacuum chamber 260 houses plates 282 of the reflectron of the TOF mass spectrometer. In particular, grooves in the interior edges of rails 280*c*, 280*d* support plates 282 and provide an insulator between the plates 282. (Not all of the reflectron plates 282 are shown in FIG. 6 to provide further clarity and perspective to the figure.) The reflectron is made up of 31 circular plates 282 with a 1.3 inch diameter hole through the center, thus allowing ions entering the mass spectrometer vacuum chamber 260 to pass into the reflectron. As previously described, the path of travel of the ions is slowed and reversed in the reflectron and detected by ion detector 283, which is located closer to end plate 280*a* than the reflectron. This serves to increase the drift region of the mass spectrometer in a more compact space. It is also noted that the drift region of the mass spectrometer thus extends from the electrode 197 that defines the end of the extraction region (visible in FIG. 4) into the reflectron of the mass spectrometer vacuum chamber 260 of FIG. 5.

For the particular TOF mass spectrometer used in the embodiment, the plates step down in voltage steps starting at 6000 volts on the plate 282 furthest from end plate 280*a* to ground for the plate 282 nearest end plate 280*a*. A network of resistors between each plate 282 have values that step down the voltage according to the equation of a circle, as discussed above for the nonlinear reflectron TOF mass spectrometer. Resistors of the resistor network are not visible in FIG. 6, but are located at the ends of teeth of dielectric resistor stock, and extend through bores in top rail so that they are interposed between plates 282. Thus, ions that are accelerated along the Z axis by electrodes 197, 197*a* in the extraction region of the roughing vacuum chamber portion 184 are slowed in the reflectron, reverse their direction, and are focused for detection at the detector 283, regardless of their mass.

In addition, the mass spectrometer includes a second detector 283*a* toward the end flange 284 of the mass spectrometer vacuum chamber 260. With power not supplied to plates 282 of the reflectron, ions will thus travel directly to the second detector 28, thus providing a traditional linear TOF mass spectrometer (as in FIG. 1). This mode may be selected when greater sensitivity is required, for example, where the suspected sample includes ions having a larger mass. Alternatively, the mode can be switched by control unit 160 while the laser is being pulsed for an unknown sample. For example, where the attenuator and focusing lens 236 is stepped by the control unit 160 so that the laser light is better matched for larger molecules, the control unit 160 may also simultaneously power down the reflectron and receive data from second detector 283*a*.

As noted above, for a typical sample 108 positioned into opening, once the vacuum is established and the ball valve 199 is opened (thus connecting the drift region of the roughing vacuum chamber portion 184 and the mass spectrometer vacuum chamber 280), the control unit 160 initiates pulsing of the laser 220 to ionize the sample 108. The signal created by detection of the ions (either by detector 283 if the reflectron is used, or by second detector 283*a* if the mass spectrometer is operated in a linear fashion without the reflectron) is sent to the control unit 160, thus enabling the control unit 160 to determine the time of flight of the ions between the time of laser pulsing and the detection. The laser is repeatedly pulsed for a sample 108, thus providing the control unit 160 multiple data points of detected signal strength versus time of flight. As noted above, the control unit 160 may step the adjustment of the attenuation and focusing lens 236 as the laser is pulsed, in order to provide optimum matching across a range of particle sizes in an unknown sample. The laser wavelength may also be adjusted. In addition, when the parameters are adjusted for relatively larger sized particles, the control unit 160 may power down the reflectron plates 282 and receive data from the second detector 283*a*, in order to increase sensitivity.

The multiple data points for a sample 108 thus provides the control unit 160 with a time series of detected signal strength versus time (time of flight). The data for the sample 108 is then analyzed by software in (or accessible by) the control unit 160, which, in conjunction with a database (either in or accessible by the control unit 160) of spectral data pertaining to biological and chemical agents, identifies the sample 108.

Figure 7:
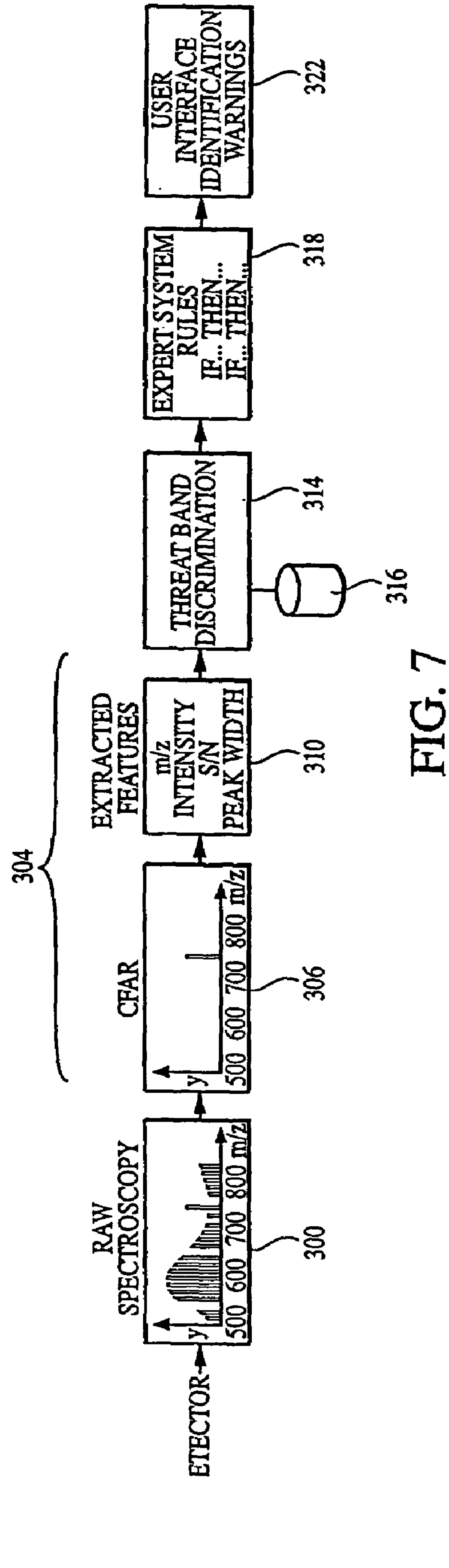
FIG. 7 depicts the processing blocks of the control unit of FIG. 3 used by the system of FIG. 3 in identifying a sample.

FIG. 7 shows the processing blocks of the control unit 160 used in the identification of the sample 108. (Control unit 160 may be any known device that provides digital processing, including a controller, processor, microprocessor, computer, microcomputer, PC, etc.) As noted, the data points pertaining to the sample 108 received at the detector 283 (or 283*a*) provide the control unit 160 with a time series of signal strength versus time of flight. Included in the time series is one or more peaks corresponding to detection of ions (of fragments thereof) extracted from the sample 108 having one or more characteristic mass. The position of the peaks corresponds to the time of flight of the ion in the mass spectrometer. The time series provides the "mass spectrum", since the ion mass is proportional to the square of the time. The analog signal strength data from the detector is converted to digital data in the control unit 160 (or an associated A/D converter) prior to further processing of the time series in the control unit 160. For example, the detected signal strength may be sampled at 500 Mhz and the digitized signal strength values are associated with corresponding time intervals of 2 ns. (These will be referred to alternatively as the "sampling interval" or the "mass spectrum sequence number" below.) By using multiple laser firings for a sample 108 in the manner described above (for example, on the order of 50–80 laser firings per sample 108) and averaging the resulting time series together, the signal strength to noise ratio improves. The mass spectrum is stored in a memory associated with the control unit 160.

FIG. 7 provides an overview of the sample identification processing, which is described in further detail below. Either automatically or by operator selection, the mass spectrum file 300 is read into a mass spectrum detector module 304 that comprises a CFAR (constant false alarm rate) module 306 and is subjected to a search along the mass axis for anomalously high peak intensities. A local threshold for defining a peak is set by a desired false alarm rate. Groups of threshold crossings that satisfy the criteria for a substance peak are thus identified in the spectrum and features corresponding to the threshold crossings are extracted in module 310 and passed to a threat band discriminator 314 module of the control unit 160.

Each substance (i.e., biological agent, chemical agent, etc.) that is of concern and desirable to be detected has a corresponding set of mass "bands" that is obtained and classified, for example, using comprehensive mass spectral analysis performed under repeated and controlled conditions in the laboratory. The laboratory data is stored in a database 316 associated with the threat band discriminator module 314. The processing in the threat band discriminator module 314 determines whether one or more peaks identified from the sample in the detector module 304 fall within one or more bands of a substance as stored in the database 316.

Logical operations may be invoked by the threat band discriminator module 314 or in a subsequent logic module 318 to require peaks to be present in multiple bands in the database substance before the corresponding substance is declared present in the sample. A scoring for the detected substance may also be computed in the logic module (which may be based upon spectroscopists' previous assessment of the importance of each band or other statistical analysis) and the score is presented on a display, an alarm is invoked, etc. (module 322).

The processing provided by software of the control unit 160 is now described in more detail. The CFAR 306, feature extraction 310 and related processing, collectively referred to as the mass spectrum signal detector 304, is depicted in more detail in FIG. 8. The inputs to the detector module 304 from the detector (283, 283*a*) of the mass spectrometer are the averaged spectral intensity values, their corresponding M/Z values, the number of spectra used to compute the average, and the minimum non-zero value out of the A/D (not shown).

Prior to processing by the CFAR module 306, the data received from the A/D converter is scaled by the signal detector in block 305. First, all samples with zero intensity are removed if required. This is done to compensate for the skew in the distribution when the A/D converter in the mass spectrometer (for example, a Kratos MALDI IV mass spectrometer) is set above the local noise level. This step can be skipped when the A/D is set such that the lowest bit is toggled by the background noise.

The scaled spectral data is input to the CFAR module 306, which also has a model of the background noise of the spectrometer. Modeling the noise of the particular instrument is generally pre-programmed and may be done theoretically, empirically, based on manufacturer's specifications, or any other manner. Depending on the particular instrument, the noise may be a recognizable distribution, such as a Poisson distribution or a log normal distribution. Alternatively, it may not conform to a recognized function and may be modeled in an entirely empirical manner based on taking noise measurements over the mass spectrum for the spectrometer. Also, the noise distribution may change based on the location in the mass spectrum for a device. For example, the noise spectrum may be a Poisson distribution at low masses and a log normal distribution at high masses. Alternatively, the noise spectrum may be a recognized distribution at low masses and a purely empirical function at higher masses. The processing of the CFAR module 306 provides a statistical comparison of the sum of the intensities in sample test cells of the mass spectral data (described further below) to that expected by an estimate of the local noise background. To determine the CFAR threshold used in the determination of whether a particular substance is in a sample, the threshold is computed with respect to a distribution that is determined from measuring the noise distribution(s) of the spectral data.

For example, a Poisson distribution provides the best model of the performance of the Kratos MALDI IV mass spectrometer. (Although the processing for a Poisson distribution is the focus of the following description of the embodiment, it will be understood that the modeling of the noise distributions may be different depending on the particular instrument used, as described directly above.) The spectral data is scaled by the number spectra used to compute average and the minimum non-zero value from the A/D in block 305. The number spectra (Nspectra in FIG. 8) is divided by parameter "Requant" in order to return the averaged spectra values to integer values for processing according to the Poisson distribution, described below.

Figure 9:
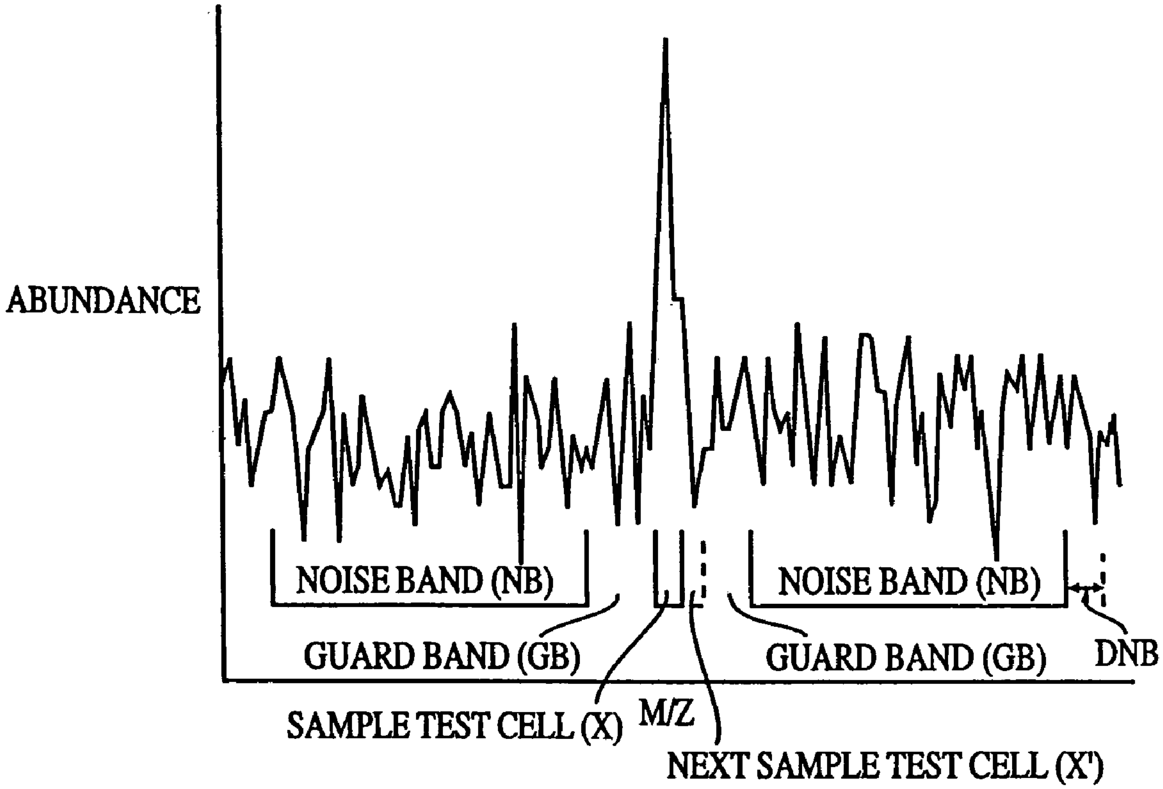
FIG. 9 is a graph of a representative portion of the spectral data received from the mass spectrometer, including depiction of a sample test cell, noise bands and guard bands used by the control unit in identifying a sample.

FIG. 9 is used to illustrate how the CFAR module 306 processes the spectral data for a sample. As noted, the spectral data comprises an intensity ("Abundance") value for an M/Z interval (or sampling interval) as output by the A/D converter. First, a signal resolution cell w is defined by the CFAR module 306 at a point m/z under consideration as:

$$w(m/z)=(m/z)/(m/\Delta M),\text{ where:}$$

m/z=mass to charge ratio for which resolution is to be calculated, and m/ΔM=spectrometer resolution, which is a known characteristic of the spectrometer.

Thus the signal resolution cell size w changes with m/z. The mass spectral data is comprised of a sequence of m/z and corresponding intensity pairs d(k) versus $m/z_k$ (k=1 . . . N), where k is the sample index of $m/z_k$ in the spectrum and N is the total number of sample intervals in the spectrum. Sample test cells (as shown in FIG. 9) are created based on the resolution cell size w and are used as the principle parameter for spectral analysis. An estimate x(k) of the intensity in a sample test cell located about $m/z_k$ is determined by the CFAR module 306 by:

$$x(k)=\sum_{n=1}^{N} r(n-k)d(n) \qquad \text{Eq. 1}$$

$$r(p)=\begin{cases}1 & \text{if } -f*\frac{w(k)}{2}\le p\le f*\frac{w(k)}{2}\\ 0 & \text{otherwise}\end{cases}$$

d(n)=mass spectrum intensity at mass spectrum sequence number n k=mass spectrum sequence number (sampling interval number) at center of sample test cell for which signal is being estimated; ranges from k=1+Δ . . . N−Δ f=user defined fraction w(k)=spectrometer mass resolution cell width at mass $m_k$ Δ=nearest integer greater than or equal to $$f*\frac{w(k)}{2}$$

It is noted that r(p) is a function of the user defined fractions f. The user thus decides (by selecting or otherwise inputting a value for f via, for example, a menu on a GUI) how much of a signal resolution cell w to include in the sample test cell x through the choice of the fractions f. It is seen that each sample test cell x is determined from a sum of intensities d(n) for mass sequence numbers in the mass spectrum data that begin at one-half a resolution cell (adjusted by the factor f) below K and end at one-half a resolution cell (adjusted by the factor f) above K. For example, if the factor f selected is 0.5, then the intensity for the sample test cell x comprises ½ of a signal resolution cell w (i.e., from p=−w/4 to +w/4). Thus, the intensity of sample test cell x is provided from one-half of a signal resolution cell w (which itself is comprised of the much smaller time intervals corresponding to the mass spectrum sequence number (sampling interval)). The value x provides an estimate of intensity for the sample test cell for the value of m/z given by $m/z_k$.

Guard bands GB and noise bands NB shown in FIG. 9 are also determined in the CFAR module 306. These bands are defined based upon the location of the sample test cell x and their sizes are defined by upper and lower boundary parameters described below. The background noise estimate is taken from the samples in the noise bands NB. The guard bands GB serve to provide a separation from potential signal samples and the samples used to estimate the noise. Thus, the noise estimate λ(k) in the neighborhood of $m/z_k$ is determined in the CFAR module 306 by:

$$\lambda(k)=E[d(q)]$$

where q ranges between k+p≦q≦k+l and k−l≦q≦k−p p=lower bound of noise band l=upper bound of noise band In the above equation, q ranges from k+p to k+l, thus across the right-hand (upper) noise band NB of FIG. 9, and from k−l to k−p, thus across the left-hand (lower) noise band NB of FIG. 9. Thus, the expectation operator E provides the mean value λ of intensities for the sampling intervals in both upper and lower noise bands NB. Prior to determining whether the intensity x(k) at the mass value $m/z_k$ under consideration is signal or noise, the CFAR module 306 first adjusts the noise estimate in accordance with the sampling intervals in the sample test cell, i.e.:

$$\lambda'(k)=\lambda(k)*\text{number of sampling intervals in the sample test cell}$$

In the embodiment, the threshold test for signal is based on the assumption that the noise samples come from a Poisson distribution (as noted above) with probability density function (pdf) given by $$f(x\mid\lambda)=\frac{e^{-\lambda}\lambda^{x}}{x!}\quad \text{for } x=0,1,2,\ldots \qquad \text{Eq. 2}$$
$$=0 \quad \text{otherwise.}$$

A property of the Poisson distribution is that both the mean and variance of the distribution are given by the parameter %. The maximum likelihood estimate (MLE) for λ, for a given data set, is simply equivalent to the mean of the samples in the data set. Thus, the noise estimate λ'(k) provides the estimate of λ in Eq. 2 for the local background noise in the sample test cell. In addition, another property of the Poisson distribution is that a sum of N Poisson random variates with parameter, λ, is itself a Poisson variate with parameter, N*λ. Thus, a threshold is computed, below which, the expected value of the sum of the sampling intervals in the sample test cell should be, if the samples are from background noise.

The user of the mass spectrometer selects a probability of false alarm $P_{FA}$ for a spectral intensity in the sample test cell that is to be associated with identification of the sample. Having selected $P_{FA}$, the threshold T'(k) to test for signal or noise is thus computed by the CFAR module 306 by substituting the noise estimate λ'(k) for the Poisson parameter in Eq. 2 and solving for T'(k):

$$P_{FA}=\int_{T'(k)}^{\infty}\frac{\lambda'(k)^{x}}{x!}e^{-\lambda'(k)}dx \qquad \text{Eq. 3}$$

As the Poisson parameter λ'(k) gets large, the Poisson distribution may alternatively be approximated with a normal distribution with mean and variance equal to λ'(k). This is convenient because as λ'(k) gets large, the number of iterations required by the inverse Poisson cumulative distribution function to compute a threshold increases.

As an aside, as previously noted, the invention includes any noise distribution that may be encountered, not just a Poisson distribution. Thus, although the probability distribution under the integral sign is a Poisson distribution, any functional form for the pertinent noise may be substituted under the integral sign and may be used to solve for T'. Thus, in the general case, where the probability density function for the noise distribution at a sample index k is represented as N(x, k), which then implies another noise distribution M(x, k) for the sum in the sample test cell, the threshold for a desired false alarm rate may be determined by solving:

$$P_{FA}=\int_{T'(k)}^{\infty}M(x,k)dx \qquad \text{Eq. 3a}$$

for T'. That T' will then provide the user with the desired false alarm rate, to the accuracy of the noise distribution.

Returning to the exemplary embodiment, when the threshold T'(k) is so determined, it is used by the CFAR module 306 to determine whether the intensity x(k) for the sample test cell at mass value $m/z_k$ under consideration is signal or noise. If x(k) is greater than or equal to T'(k), the CFAR module 306 concludes that a signal is detected; if x(k) is less than T'(k), the CFAR module 306 concludes that it is noise.

The above-described processing is applied by the CFAR module 306 to the spectral data for each k that ranges from $k_{low}$ to $k_{hi}$, where:

$k_{low}$=lower bound of spectrum which allows for widths of test, guard, and noise windows; and $k_{hi}$=upper bound of spectrum which allows for widths of test, guard, and noise windows)

Following such processing for each k, The CFAR module 306 checks for x(k)≧T'(k), thus determining whether the detected signal at each k is signal or noise. As k ranges from $k_{low}$ to $k_{hi}$ for each x(k)≧T(k), the following information is determined and stored for each cell (k) tested:

M/Z of center of the sample test cell,

Sum of intensities x(k) of sampling intervals in the sample test cell,

Mean of intensity of sampling intervals in the sample test cell,

Threshold T'(k) used to test the sum,

10*log 10(Sum of intensities of samples in sample test cell/Threshold for sum), and 10*log 10(Mean of intensity of samples in sample test cell/Estimate of noise mean (λ)

Flag indicating signal present (=1) or just noise (=0)

After a sample test cell is tested, the procedure advances over the user-input fraction of a resolution cell f described above to arrive at the next sample test cell (x' in FIG. 9) and the computations are repeated. (The actual advancement in the mass spectrum is carried out by increasing the indices k for the sampling interval by a corresponding amount $k_{inc}$). As noted, a typical amount of advancement is ½ of a resolution cell.

Referring back to FIG. 9, as the sample test cell advances to the right in the mass spectrum, the right-hand noise band NB moves by a corresponding amount, thus enveloping a new portion of the mass spectral data shown as DNB. Since the purpose of the noise band is to evaluate the next sample test cell (x'), the new portion DNB is evaluated to determine if it might contain signal data instead of noise. The CFAR module 160 determines if the spectrum takes a sharp rise (indicating signal) and, if so, discounts the contribution of DNB to the noise band temporarily to determine if it is noise or signal. Thus, before being used to estimate the noise, the net intensity $I(k_{new})$ of the sampling intervals $k_{new}$ in DNB is tested against a threshold computed from the inverse Poisson cumulative distribution function, the current MLE for the noise background λ, and a "peak shear" probability, in an equation analogous to Eq. 3. The "peak shear" probability is substituted for $P_{FA}$, in Eq. 3. The peak shear value is input or selected by the user (for example, via a GUI) and gives the user flexibility to adjust the probability so that it is greater or less than the false alarm rate $P_{FA}$ discussed above. In general, the peak shear probability used to evaluate DNB may be set to be the same as the false alarm probability as in Eq. 3.

If the intensity of the new spectral interval included in the noise band DNB is greater than the computed threshold, it is replaced for noise computations by a random sample generated using a Poisson random number generator and the current MLE for the background noise λ. The purpose for this replacement is to minimize the contribution of possible signal peaks in the noise bands when evaluating the next sample test cell x' for signal or noise.

This procedure is implemented by CFAR module 160 for the next sample test cell as the processing advances through higher masses in the spectral data (as discussed above, by an amount given by sampling interval $k_{inc}$ determined by the fraction f of a resolution cell) in the following manner:

$$I(k_{new}) = \begin{Bmatrix} I(k_{new}) & \text{if } I(k_{new}) \le T(k) \\ PoissRand(\lambda(k)) & \text{if } I(k_{new}) > T(k) \end{Bmatrix}$$

where $k+k_{inc}+p \leqq k_{new} \leqq k+k_{inc}+l$ p=lower bound of noise band l=upper bound of noise band T(k) is obtained by solving $$P_{FAshear} = \int_{T(k)}^{\infty} \frac{\lambda(k)^x}{x!} e^{-\lambda(k)} dx$$

for user-supplied $P_{FAshear}$ PoissRand (λ(k))=random draws on a Poisson dist. with λ from the current noise window As discussed in detail above, the Poisson distribution is used as the noise distribution of the spectrometer in the exemplary embodiment. However, other noise distributions are possible and will be dependent on the characteristics of the mass spectrometer. The particular noise distribution for the mass range under consideration for the particular instrument is used in the evaluation of whether a signal or noise is present at the sample test call, as well as the determination of whether the intensity of the new spectral interval included in the noise band DNB is signal or noise.)

The outputs of the CFAR module 306 noted above are processed further in extraction module 310 to extract signal features. Extraction module first locates contiguous blocks of sample test cells that have been characterized as "signal" (i.e., exceed the thresholds), as represented in block 310*a* of FIG. 8. (At this point, a contiguous block may include one sample test cell.) For each such contiguous block, the base width Bw, the edge M/Z values, and the SNR are determined. The SNR for a block is determined as the maximum SNR of the sample test cells comprising the block, where the SNR of each individual sample test cell is given by the x(k)λ'(k). The extraction module 310 then identifies the local maxima of signal intensity of sample test cells within each contiguous block (as represented by block 310*b* of FIG. 8). For each such local maxima of a block, the M/Z value M, the SNR, Bw and the mean intensity I (i.e., the average intensity of sampling intervals in the sample test cell) of the corresponding sample test cell are output to the threat band discrimination module 314 (shown in FIG. 7). (As noted, at least at this point, a contiguous block of sample test cells may comprise one sample test cell.)

Each contiguous block of signal resolution cells that are characterized "signals" thus potentially corresponds to a characteristic spectral band of a biological or chemical agent. Although module 314 is referred to as a "threat band discriminator module", it is understood that the term "threat" is a shorthand for a chemical or biological substance or agent that is desired to be detected. The threat band discriminator module 314 processes the data corresponding to each contiguous block using three criteria:

1) conformity to expected peak width range;
2) coincidence with a library of threat band mass intervals;
3) adherence to pre-determined requirements for number and identity of threat bands necessary for an alert of a given threat.

The first criterion applied by the threat band discriminator module 314 distinguishes a valid mass spectrum line from noise or detector anomalies based on shape of the peak. For example, a block that is too "spiky", that is, has multiple local maxima, is contrary to the expectation that a valid spectrum line will typically have width on the order of the mass resolution of the spectrometer and decrease smoothly on both sides from one maximum value. Thus, module 314 considers whether the block of sample test cells includes multiple local maxima, for example, two. If so, then the discriminator module 314 concludes the block is an anomaly and ignores it for further consideration in identification of the sample. (In addition, where a "block" of contiguous sample test cells comprises one sample test cell and the sample test cell is one-half a resolution cell, then the discriminator module 314 will conclude that the block is an anomaly and ignore it.)

In addition, a block of signals where the peak is relatively broad is often the result of an overabundance of ions produced by excessive laser power. In order to eliminate a signal that is due to an isolated, high intensity sample, the discriminator module requires that the block of contiguous cells comprising signals be wider than a lower limit of bandwidth and not exceed an upper limit of bandwidth. Thus, for a block $Bw_j$, the discriminator module 314 determines whether:

$$Bw^i_{lowlim} \leqq Bw_j \leqq Bw^i_{hilim}, \text{ where}$$

$Bw^i_{lowlim}$=lowest acceptable base width for Band i, and $Bw^i_{hilim}$ is the highest acceptable base width for Band i.

Band i may be based on expert input. For example, based on expert analysis and observations, anthrax may have a main signal component having width from 6–8 KDa. Alternatively, Band i may be based on a statistical compilation of significant number of samples. If the block $Bw_j$ fails to fall within these bandwidth parameters, it is ignored for the purposes of identifying the sample.

The remaining bands (blocks of contiguous cells identified as signals) identified from the sample 108 are used in the second criterion referred to above, thus providing the fundamental step in the band detection method. The threat band discriminator module 314 has an associated database 316 of threat agent identities and corresponding characteristic spectral bands (signature bands) for each particular threat agent. The spectral bands for a threat agent comprise mass intervals that bound the signature bands. Spectral signatures used for threat agents stored in database 316 are carefully developed using mass spectrometers under laboratory conditions and have proven to be constant to a few parts in a thousand of the m/z value, in particular, for spectral signatures below 88,000 Da. (Such highly stable signatures permit narrower band limits, hence better false alarm rejection.)

The threat band discriminator module 314 compares the bands (or single band) identified from the sample 108 with the signature bands of the threat agents stored in the database 316. If a band (or multiple bands) identified from the sample correspond to a signature band (or multiple signature bands) of a threat agent in the database 316, that provides an indication that the threat agent as identified in the database 316 is present in the sample.

Thus, a band $\{M_j, I_j, Bw_j\}$ identified from a sample 108 is determined by the threat band discriminator module 314 to fall within a signature band $B_i$ of a threat agent in the database 316 (i.e., $\{M_j, I_j, Bw_j\} \epsilon B_i$) if $M_j$ is greater than or equal to the lower mass interval that bounds the signature band m/z and less than or equal to the upper mass interval that bounds the signature band. If one or more bands identified from a sample 108 is determined to fall within a signature band of a threat agent in the database 316, that provides an indication that the threat agent is present in the sample 108. Of course, if there are two or more bands identified from a sample 108, the discriminator module 314 may determine that they indicate the presence of multiple threat agents in the sample.

The threat band discriminator module 314 outputs the identity of the threat agent indicated in the sample 108 and the band or bands identified from the sample 108 to expert system rules module 318. The premise of the expert system rules module 318 is that some agents may be indicated reliably by one particular spectrum line, while others may only be indicated reliably with the presence of multiple lines. The expert system rules module 318 includes a database of threat agents and a corresponding characterization of their signature bands. (Alternatively, the system user may provide inputs for the band classifications for an indicated threat agent.) The signature bands may be categorized, for example, as follows:

1. Must Have A "Must Have" band is one that must be present in the spectrum in order to classify a substance as present.
2. Must Have M of N Group A set of two or more bands designated as "Must Have M of N Group" means that in order to classify a substance as present, at least M of these N bands must be present in the spectrum.
3. Like to Have—High A band designated as "Like to Have—High" is one in which, based on the experience of human analysts, there is a strong desire to have this band present in the spectrum in order to classify a substance present. However, the band is not required to be present.
4. Like to Have—Medium A band designated as "Like to Have—Medium" is one in which, based on the experience of human analysts, there is a moderate desire to have this band present in the spectrum in order to classify a substance present. However, the band is not required to be present.
5. Like to Have—Low A band designated as "Like to Have—Low" is one in which, based on the experience of human analysts, there is a weak desire to have this band present in the spectrum in order to classify a substance present. However, the band is not required to be present.

Each threat agent included in the expert rules database has at least one band designated as category one, or two or more bands designated as category two. The designations are the product of laboratory experiments by specialists or field experience by operators. Other bands (if any) are categorized as categories three, four or five. (These are useful in a scoring, described below.) The expert system rules module 318 uses the identity of the threat agent indicated in the sample 108 to access the database to withdraw the classifications of the bands for the indicated threat agent. In order to classify a threat agent as present in a sample 108, all category one bands and at least M of the N bands designated as category two must be present in the spectrum.

The rules module 318 calculates a score, for example, a number between zero and one inclusive, that is based on the presence of spectral bands in the sample 108 for the indicated threat agent and the corresponding category designation for each band. In general, in order to get a score of one, all bands must be present, regardless of category. The scoring formula reflects the desire, but not the necessity, to have the "extra" bands specified by categories two, three, four and five present. (For category 2, the case that at least M of the N category two bands must present, the "extra" bands in category two are the extra N minus M bands. If more than M bands are present, then these bands are considered "extra".)

A score for a threat agent indicated in the sample may be given, for example, by:

$$\text{Score}=(1-\Delta)*\alpha+(P_{d2}*\Delta_2+P_{d3}*\Delta_3+P_{d4}*\Delta_4+P_{d5}*\Delta_5)$$

where $\Delta=\Delta_2+\Delta_3+\Delta_4+\Delta_5$;

$\Delta_2=0.12$ if category 2 bands are designated, 0 otherwise;

$\Delta_3=0.12$ if category 3 bands are designated, 0 otherwise;

$\Delta_4=0.06$ if category 4 bands are designated, 0 otherwise;

$\Delta_5=0.03$ if category 5 bands are designated, 0 otherwise;

$\alpha=1$ if all category one bands are present in the spectrum and at least M of the N category two bands are present in the spectrum, 0 otherwise;

$P_{d2}=(N_{d2}-M)/(N_2-M)$, if $N_{d2}\geqq M$ and $N_{d2}/M$, if $N_{d2}<M$;

$N_{d2}$=Total number of category two bands present in spectrum;

M=Number of category two bands that must be present to classify a substance as present $N_2$=Total number of category two bands specified;

$P_{di}=N_{di}/Ni$ for i=1, 2, and 3;

$N_{di}$=Total number of category i bands present in the spectrum;

$N_i$=Total number of category i bands specified.

A threshold between zero and one may be input or stored. If the score exceeds the threshold, the control unit 160 determines that the threat agent is present in the sample 108 and the user is alerted in block 322 of the presence of the threat agent. The threshold is set, for example, to require that the "must have" bands of category 1 and/or 2 for the agent must be found in the sample before the score exceeds the threshold.

Figure 8:
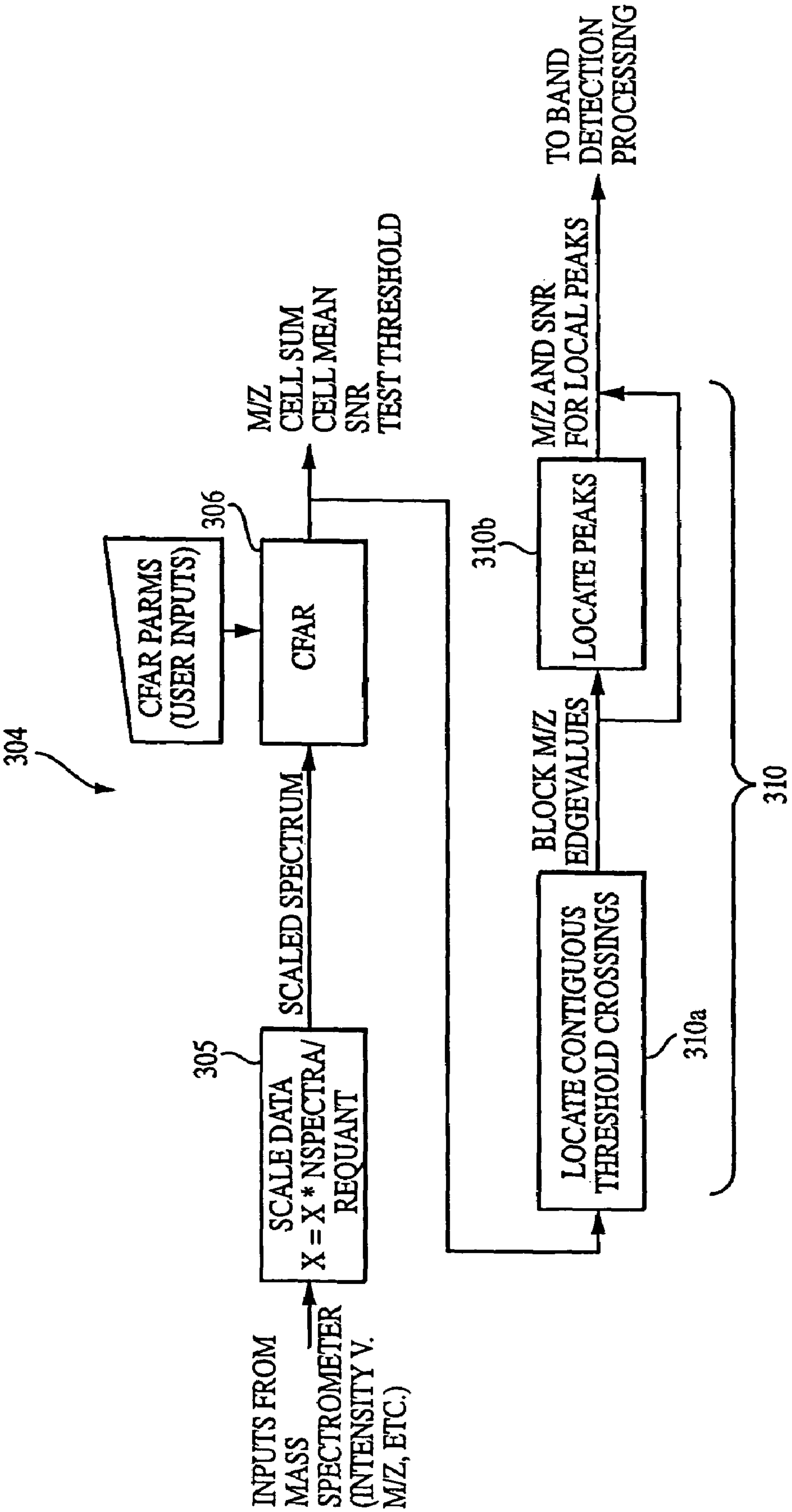
FIG. 8 depicts additional processing details of a CFAR module, feature extraction module and other related processing shown in FIG. 7.

It is noted that the processing by the control unit 160 depicted in FIGS. 7–9 and described in the related text above is not necessarily limited to a field portable mass spectrometer. The processing may be applied to any mass spectrometer that provides the substantially the same spectral inputs as that described above. Thus, for example, the processing described above may be applied to laboratory and commercial spectrometers. It is also not limited to a TOF mass spectrometer.

The above-described system is particularly useful in the detection of a broad range of biological and chemical agents. This includes toxins, such as peptides and proteins, and viruses, which have a relatively simple structure. It also includes bacteria, including vegetative bacteria and spores, that may have a large, complex structure comprising DNA and RNA.

As repeatedly referenced in the description above, the control unit 160 may coordinate and control all of the components so that all of the tasks performed by the system 100 starting with collection of a sample 108 by the collector 102 and ending with identification of a chemical or biological agent contained in the sample 108 by the control unit processing and output to a user is performed automatically, without the requirement of user input.

The system 100 may also provide for user input for various parameters also discussed above. For example, the user may provide the probability of false alarm $P_{FA}$ used in the CFAR module 304 in the sample identification processing as discussed above. As another example, the user may also select a subset of the threats maintained in the database 316 of the threat band discriminator module 314, and the control unit 160 will only evaluate the sample data against the spectral lines for those threats. The parameters used for the scoring and/or the threshold in the rules module 318 may also be adjusted by a user. Alternatively, the system may allow the user to bypass certain processing modules or steps described above. For example, the rules module itself may be bypassed if the user is interested in being notified of any match between the sample 108 and a chemical or biological agent in the database 316 found by the threat band discriminator module 314.

Such user input may be provided, for example, through a GUI that presents a user with menus for the various options and parameters. The GUI may also provide output to the user, such as a list of detected substances, visual alerts, etc. The GUI may be remote from the system 100 itself and may interface with the control unit 160 wirelessly, via a network, etc. Once the inputs are provided, as noted, the system may automatically provide all sample collection transport and analysis under the control of the control unit 160.

In addition, certain of the above-described elements of system 100 may be replaced with substitute procedures, eliminated, etc. For example, criteria 1 of the threat band discriminator module 314 relating to peak width range described above may be eliminated. While this may provide a slightly greater incidence of false alarms, it will still provide reliable identification of actual threats.

Figure 10:
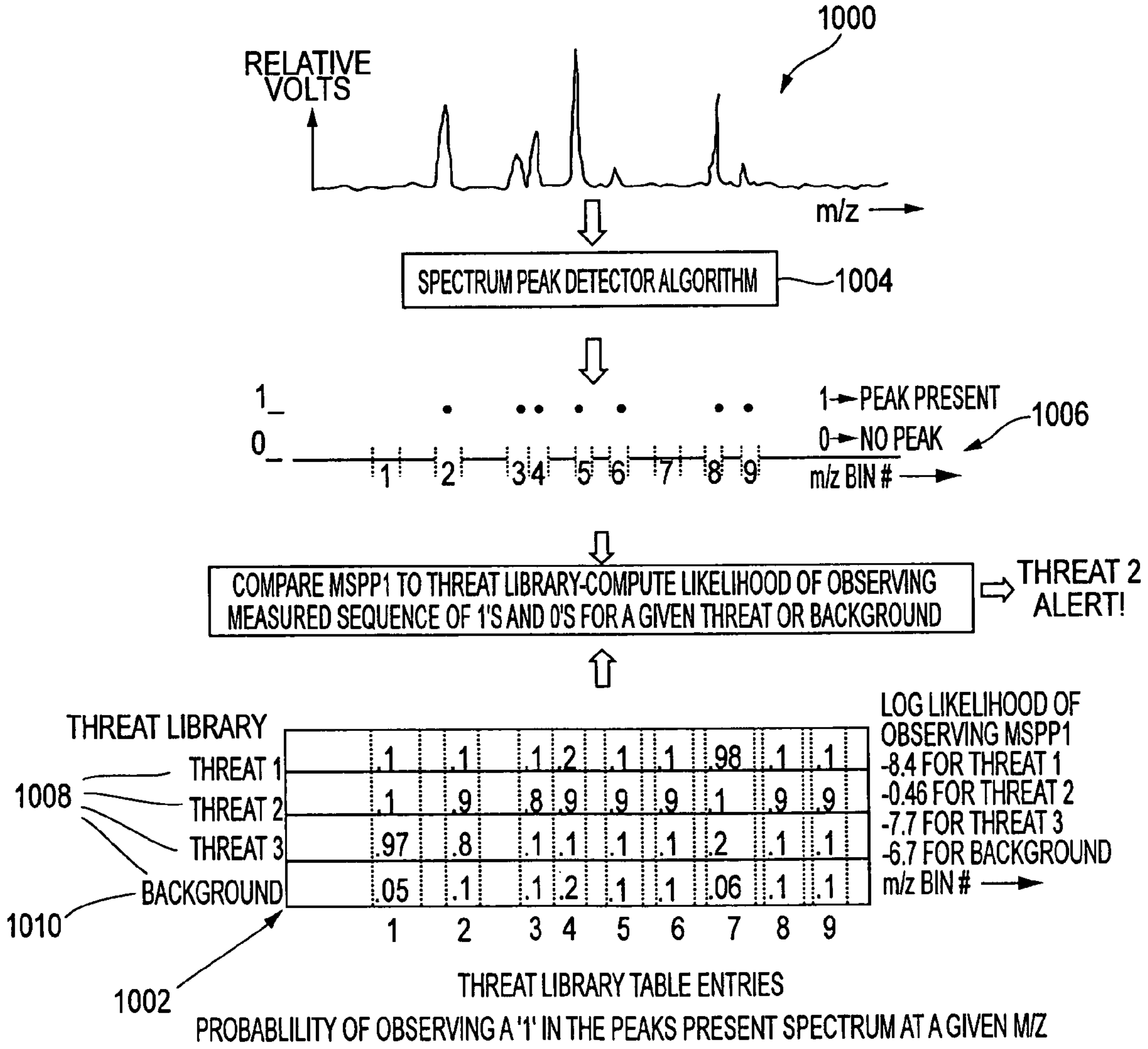
FIG. 10 is a diagram of steps of using a threat/background library to identify presence of a threat substance in the time-of-flight mass spectrometer (TOF-MS) acquired spectrum.

In another embodiment, described below, the use of "threat bands" as used by expert system rules module 318 can be replaced with a maximum likelihood algorithm for identifying threat. FIG. 10 illustrates the steps for using a threat/background library in a maximum likelihood algorithm to identify presence of a threat substance in the time-of-flight mass spectrometer (TOF-MS) acquired spectrum. Assuming that TOF-MS spectra from threats of interest are available prior to instrument deployment, the objective of determining if the TOF-MS has encountered a threat substance can be met by comparing a newly acquired spectrum (MS1) 1000 to previously acquired spectra of the threat substances stored in a threat library 1002.

Figure 11:
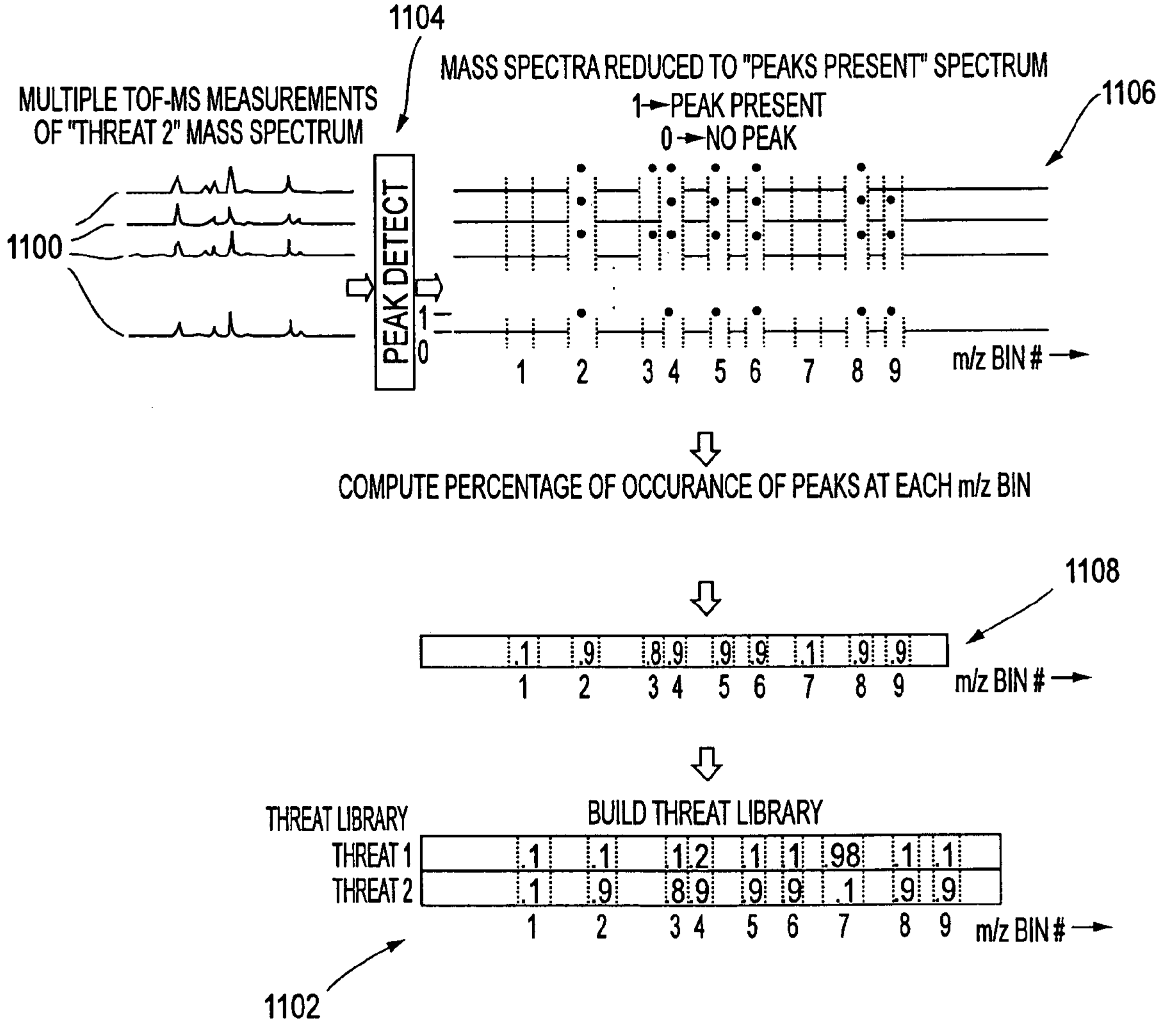
FIG. 11 is a diagram of steps for characterizing threat spectra and compiling a threat library used to determine if the mass spectrometer encounters a threat during deployment as illustrated in FIG. 10.

After the new spectrum 1000, typically an average of individual spectra from multiple laser shots on the analyte, is acquired, as described above, it is subjected to a peak picking algorithm 1004 that identifies spectral peaks. The peak picking algorithm used in development and test of this invention was the CFAR technique described earlier in this application. Other algorithms for peak picking could also be used. The mass/charge (m/z) values at which the peaks occur are stored as a set representation (MSPP1) 1006. In this set representation peak presence is indicated by 1, while peak absence is indicated by 0. The constant false alarm (CFAR) algorithm 306, described above with reference to FIGS. 10 and 11, for peak selection, effectively accomplishes this. The present inventive method permits real time adaptation to changes in local noise in the background mass spectrum when combined with a fast spectral peak picker approach, e.g. CFAR algorithm. Use of consistent values defining successive mass bins based on the mass spectrometer's inherent resolution simplifies cross-spectral comparison.

A threat library is compiled using frequency of occurrence of peaks over large collections of previously gathered spectra. The threat library may be compiled according to a method illustrated in FIG. 11, where characterization of threat spectra is used. This exemplary method of threat library construction is performed as follows. Prior to instrument deployment in the field, trials are conducted to characterize each threat's spectrum. For each threat, multiple spectra 1100 are measured using the TOF-MS. The peak picking algorithm 1104 identifies m/z values corresponding to the threat's spectral peaks. The frequency of occurrence of each peak is calculated using the multiple TOF-MS measurements of the threat spectrum and is preserved as a set representation 1106. The library entry 1108 for the threat is the set of probabilities, i.e., frequencies of occurrence, of peaks $P_k(1)$, and absence of peaks $P_k(0)$ for each relevant m/z. A background spectrum, where no threats are present, can be characterized, and entered in the library 1102 as a "non-threat". Various types of background can be accommodated by giving each a separate entry 1010 (FIG. 10) in the library 1002.

Returning to FIG. 10, for each of a predetermined set of masses (k, k=1 to N) derived from the threat library, the likelihood of the corresponding subset of the representation MSPP1 1006 being observed is computed, assuming each threat library 1002 member 1008 were present. The threat or non-threatening background call is made based on the ranking of the likelihood thus computed. The threat or background member 1008, whose presence would most likely result in observing representation 1006, is identified as a source of the newly acquired spectrum 1000. The likelihood of the corresponding subset of the representation MSPP1 1006 in the MS1 1000 is calculated according to Equation:

$$\text{Likelihood}(MS1 \mid a) = \left(\prod_{MSPP1(k)=1} P_k(1 \mid a)\right)\left(\prod_{MSPP1(k)=0} P_k(0 \mid a)\right),$$

where (a) is a member spectrum in the threat library, $P_k(1|a)$ is the probability of observing a "1" at mass k in (a), and $P_k(0|a)$ is the probability of observing a "0" at mass k in (a).

Thus, although illustrative embodiments of the present invention have been described herein with reference to the accompanying drawings, it is to be understood that the invention is not limited to those precise embodiments, but rather it is intended that the scope of the invention is as defined by the scope of the appended claims.

What is claimed is:

1. A method for determining a threat substance encountered by a time-of-flight mass spectrometer (TOF-MS) in a test substance, using a pre-computed threat library of a plurality of threat substances, the method comprising the steps of:

acquiring a spectrum of the test substance, said spectrum including a plurality of spectral peaks, each of plurality of spectral peaks having a mass/charge (m/z) value;

creating a peak present spectrum from the plurality of spectral peaks, wherein a peak presence at each of a plurality of ranges of m/z values is indicated by a numeral 1, while peak absence is indicated by a numeral 0;

computing for each threat substance in the threat library, a likelihood value that the threat substance is present in each of the plurality of spectral peaks of the spectrum of the test substance; and identifying the threat substance with the highest likelihood value as present in the test substance.

2. The method of claim 1, wherein said acquired spectrum is an average of individual spectra acquired from a plurality of laser shots on the analyte.

3. The method of claim 1, wherein the peak present spectrum is created by an algorithm used for peak picking, said algorithm being is robust to noise features of matrix assisted laser desorption (MALDI) mass spectrum, the noise features being selected from baseline shifts and randomness in spectral peak heights, and retains relevant aspects of MALDI mass spectra for threat identification.

4. The method of claim 1, wherein the step of computing the likelihood value is computed for each predetermined set of masses k, for k=1 to N, derived from each threat substance of the threat library.

5. The method of claim 4, wherein the likelihood value of presence of the identified threat substance is calculated according to Equation:

$$\text{Likelihood}(MS1 \mid a) = \left(\prod_{MSPP1(k)=1} P_k(1 \mid a)\right)\left(\prod_{MSPP1(k)=0} P_k(0 \mid a)\right),$$

where (a) is a member spectrum in the threat library, $P_k(1|a)$ is the probability of observing a "1" at mass k in (a), and $P_k(0|a)$ is the probability of observing a "0" at mass k in (a).

6. The method of claim 1, wherein computation of said threat library is comprising the steps of:

performing a plurality of trials and generating a plurality of spectra on a plurality of identified threats, wherein said plurality of trials being performed prior to instrument deployment in the field;

measuring, using the TOF-MS, a plurality of spectra for each the plurality of threats;

identifying mass/charge (m/z) values corresponding to each of a plurality of the threat's spectral peaks, using a peak picking algorithm for assigning a corresponding ranking code to each peak and trough of said each of a plurality of the threat's spectral peaks;

calculating a frequency of occurrence of peaks in a plurality of spectra for each the plurality of threats; and storing a set representation of said calculated frequency in the threat library.

7. The method of claim 6, wherein at least one of said plurality of identified threats is a background in which no threats are present.

8. The method of claim 6, wherein the set representation is the set of probabilities of occurrence of peaks $P_k(1)$ and absence of peaks $P_k(0)$ for each identified m/z value.

9. The method of claim 6, wherein in performance of a trial said set representation of said calculated frequency is stored in the threat library as background or non-threat spectra if said trial is performed in a known benign environment.

10. The method of claim 6, wherein in performance of a trial said set representation of said calculated frequency is stored in the threat library as a known threat spectra if said trial is performed in an environment of a known threat.

* * * * *